(12) United States Patent
Miyake et al.

(10) Patent No.: US 11,402,230 B2
(45) Date of Patent: Aug. 2, 2022

(54) NAVIGATION SYSTEM, APPARATUS AND METHOD FOR GENERATING NAVIGATION MESSAGE

(71) Applicant: NIPPON TELEGRAPH AND TELEPHONE CORPORATION, Chiyoda-ku (JP)

(72) Inventors: Asuka Miyake, Yokosuka (JP); Misa Hirao, Yokosuka (JP); Masahiro Watanabe, Yokosuka (JP); Shinji Miyahara, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 60 days.

(21) Appl. No.: 16/451,855

(22) Filed: Jun. 25, 2019

(65) Prior Publication Data

US 2020/0124437 A1    Apr. 23, 2020

(30) Foreign Application Priority Data

Oct. 22, 2018 (JP) .............................. JP2018-198447

(51) Int. Cl.
*G01C 21/36* (2006.01)
*G09B 21/00* (2006.01)
*G01C 21/20* (2006.01)

(52) U.S. Cl.
CPC ....... *G01C 21/3644* (2013.01); *G01C 21/206* (2013.01); *G01C 21/3641* (2013.01); *G01C 21/3655* (2013.01); *G09B 21/006* (2013.01)

(58) Field of Classification Search
CPC .................................................. G01C 21/3644
See application file for complete search history.

(56) References Cited

U.S. PATENT DOCUMENTS

| 7,336,226 B2 * | 2/2008 | Jung ..................... G09B 21/006 |
| | | 342/357.52 |
| 10,024,679 B2 * | 7/2018 | Moore ..................... A61H 3/06 |
| 10,024,680 B2 * | 7/2018 | Lee ....................... G01C 21/206 |

(Continued)

FOREIGN PATENT DOCUMENTS

| CN | 101799299 A | * | 8/2010 |
| EP | 2690407 A1 | * | 7/2012 |

(Continued)

OTHER PUBLICATIONS

"Audio navigation system that guides indoors and outdoors without distinction", Audio Navigation System—IBM THINK Business—Japan, retrieved from URL: https://www.ibm.com/think/jp-ja/watson/navcog/ 7 pages (with partial English translation).

(Continued)

*Primary Examiner* — Jean Paul Cass
(74) *Attorney, Agent, or Firm* — Oblon, McClelland, Maier & Neustadt, L.L.P.

(57) ABSTRACT

An apparatus for generating a navigation message includes a route generating unit configured to generate a route, and a navigation message generating unit configured to generate a navigation message about the generated route based on the generated route, one or more map information items of the generated route, and an order of priority in which map information items are presented.

11 Claims, 27 Drawing Sheets

(56) References Cited

U.S. PATENT DOCUMENTS

| | | | | |
|---|---|---|---|---|
| 10,134,304 | B1* | 11/2018 | Beals | G09B 21/006 |
| 10,360,907 | B2* | 7/2019 | Dayal | G01C 21/206 |
| 10,490,102 | B2* | 11/2019 | Djugash | G09B 21/02 |
| 10,521,669 | B2* | 12/2019 | Dayal | G06F 3/016 |
| 10,561,519 | B2* | 2/2020 | Chen | G06F 1/163 |
| 10,722,421 | B2* | 7/2020 | Yu | A45B 9/04 |
| 10,733,852 | B2* | 8/2020 | Rekimoto | H04M 1/72481 |
| 10,816,993 | B1* | 10/2020 | Tran | G05D 1/0088 |
| 10,869,805 | B2* | 12/2020 | Ng | A61H 3/066 |
| 2012/0062357 | A1* | 3/2012 | Slamka | G01C 21/20 340/4.11 |
| 2014/0379251 | A1* | 12/2014 | Tolstedt | G01C 21/206 701/410 |
| 2015/0070877 | A1* | 3/2015 | Smith | A45B 3/02 362/102 |
| 2016/0078278 | A1* | 3/2016 | Moore | G02B 27/017 345/8 |
| 2017/0102451 | A1* | 4/2017 | O'Leary | G01S 15/87 |
| 2018/0067593 | A1* | 3/2018 | Tiwari | G08B 13/22 |
| 2018/0069932 | A1* | 3/2018 | Tiwari | H04L 12/2803 |
| 2018/0075168 | A1* | 3/2018 | Tiwari | H04N 5/23238 |
| 2018/0268670 | A1* | 9/2018 | Gabbay | G01C 21/3652 |
| 2019/0088148 | A1* | 3/2019 | Jacobus | B60W 10/18 |
| 2019/0174002 | A1* | 6/2019 | Norris | H04S 7/304 |
| 2020/0020211 | A1* | 1/2020 | Gabbay | G08B 6/00 |

FOREIGN PATENT DOCUMENTS

| | | |
|---|---|---|
| JP | 2001-128149 | 5/2001 |
| JP | 2001-215130 | 8/2001 |
| JP | 2001-216595 | 8/2001 |
| JP | 2003-207358 | 7/2003 |
| JP | 2003-337041 | 11/2003 |
| JP | 2014-20788 | 2/2014 |

OTHER PUBLICATIONS

Office Action dated May 31, 2022 in Japanese Application No. 2018-198447 (w/English translation).

* cited by examiner

FIG.4

| PATH NAME | STARTING POINT | DESTINATION | LONGITUDE AND LATITUDE OF NODE 1 | LONGITUDE AND LATITUDE OF NODE 2 | LONGITUDE AND LATITUDE OF NODE 3 | ... |
|---|---|---|---|---|---|---|
| PATH 1 | CENTRAL ENTRANCE GATE AT A STATION | EXIT 5 AT A STATION | 35.6582,139.7456 | 35.6592,139.7466 | 35.6602,139.7476 | ... |
| ... | ... | ... | ... | ... | ... | ... |
| ... | ... | ... | ... | ... | ... | ... |

FIG.5

| MAP-INFORMATION-ITEM NAME | TYPE | LINE/DOT | LONGITUDE AND LATITUDE | RIGHT OR LEFT | ORIENTATION |
|---|---|---|---|---|---|
| SLOPE | ALERT ITEM | DOT | 35.6582,139.7457 | CENTRAL | DOWN |
| STEP | ALERT ITEM | DOT | 35.6582,139.7458 | CENTRAL | DOWN |
| PILLAR | ALERT ITEM | DOT | 35.6582,139.7459 | RIGHT | – |
| STAIRS | ALERT ITEM | DOT | 35.6582,139.7460 | RIGHT | UP |
| BRAILLE BLOCKS | WALKING-ASSISTANCE ITEM | LINE | 35.6582,139.7461 | LEFT | – |
| ESCALATOR | LANDMARK ITEM | DOT | 35.6582,139.7462 | LEFT | – |
| ENTRANCE GATE WITH GUIDANCE SOUND SIGN | LANDMARK ITEM | DOT | 35.6582,139.7463 | RIGHT | – |
| AUTOMATIC DOOR (GATE INFORMATION) | LANDMARK ITEM | DOT | 35.6582,139.7464 | CENTRAL | – |
| RESTROOM WITH GUIDANCE SOUND SIGN | LANDMARK ITEM | DOT | 35.6582,139.7465 | RIGHT | – |
| X COFFEE (STORE) | LANDMARK ITEM | DOT | 35.6582,139.7466 | RIGHT | – |
| ELEVATOR | LANDMARK ITEM | DOT | 35.6582,139.7467 | LEFT | – |
| SMOOTH FLOOR (TEXTURE OF ROAD SURFACE) | LANDMARK ITEM | LINE | 35.6582,139.7468 | – | UP |
| WALL | LANDMARK ITEM | LINE | 35.6582,139.7469 | BOTH SIDES | – |
| ... | ... | ... | ... | ... | ... |

FIG.6

| MAP INFORMATION ITEM/ NODE NAME | DISTANCE TO NEXT NODE | NEXT TURNING DIRECTION | NOTIFICATION POINT | DISTANCE FROM PRIOR NODE | TYPE | LONGITUDE AND LATITUDE | RIGHT OR LEFT | ORIENTATION |
|---|---|---|---|---|---|---|---|---|
| NODE 1 (STARTING POINT) | 150 | RIGHT | AVAILABLE | – | – | 35.6582,139.7457 | – | – |
| STAIRS | – | – | – | 20 | ALERT ITEM | 35.6582,139.7458 | CENTRAL | DOWN |
| PILLAR | – | – | – | 100 | ALERT ITEM | 35.6582,139.7459 | RIGHT | – |
| AUTOMATIC DOOR | – | – | – | 130 | LANDMARK ITEM | 35.6582,139.7460 | CENTRAL | – |
| NODE 2 | 170 | LEFT | AVAILABLE | – | – | 35.6582,139.7461 | – | – |
| BRAILLE BLOCKS | – | – | – | – | WALKING-ASSISTANCE ITEM | 35.6582,139.7462 | LEFT | – |
| ESCALATOR | – | – | – | 168 | LANDMARK ITEM | 35.6582,139.7463 | LEFT | DOWN |
| NODE 3 | 120 | RIGHT | AVAILABLE | – | – | 35.6582,139.7464 | – | – |
| WALL | – | – | – | – | LANDMARK ITEM | 35.6582,139.7465 | RIGHT | – |
| ELEVATOR | – | – | – | 50 | LANDMARK ITEM | 35.6582,139.7466 | LEFT | – |
| NODE 4 (DESTINATION) | 0 | – | AVAILABLE | – | – | 35.6582,139.7467 | – | – |

THE DESTINATION IS 440 METERS AHEAD FROM THE STARTING POINT IN 1 O'CLOCK DIRECTION.
ON THE WAY, MAKE TWO TURNS.

FIG.11A

| MAP INFORMATION ITEM/ NODE NAME | DISTANCE TO NEXT NODE | NEXT TURNING DIRECTION | NOTIFI- CATION POINT | DISTANCE FROM PRIOR NODE | TYPE | LONGITUDE AND LATITUDE | RIGHT OR LEFT | ORI- ENTA- TION |
|---|---|---|---|---|---|---|---|---|
| NODE 1 (STARTING POINT) | 150 | RIGHT | AVAILABLE | - | - | 35.6582,139.7457 | - | - |
| STAIRS | - | - | - | 20 | ALERT ITEM | 35.6582,139.7458 | CENTRAL | DOWN |
| PILLAR | - | - | - | 100 | ALERT ITEM | 35.6582,139.7459 | RIGHT | - |
| AUTOMATIC DOOR | - | - | - | 130 | LANDMARK ITEM | 35.6582,139.7460 | CENTRAL | - |
| NODE 2 | 170 | LEFT | AVAILABLE | - | - | 35.6582,139.7461 | - | - |

FIG.11B

AT A DISTANCE OF 150 METERS, TURN RIGHT. ON THE WAY, STAIRS GOING DOWN ARE 20 METERS AHEAD AT A CENTRAL LOCATION, AND A PILLAR IS 100 METERS AHEAD ON THE RIGHT

FIG.12A

| MAP INFORMATION ITEM/ NODE NAME | DISTANCE TO NEXT NODE | NEXT TURNING DIRECTION | NOTIFI-CATION POINT | DISTANCE FROM PRIOR NODE | TYPE | LONGITUDE AND LATITUDE | RIGHT OR LEFT | ORI-ENTA-TION |
|---|---|---|---|---|---|---|---|---|
| NODE 2 | 170 | LEFT | AVAILABLE | - | - | 35.6582,139.7461 | - | - |
| BRAILLE BLOCKS | - | - | - | - | WALKING-ASSISTANCE ITEM | 35.6582,139.7462 | LEFT | - |
| ESCALATOR | - | - | - | 168 | LANDMARK ITEM | 35.6582,139.7463 | LEFT | DOWN |
| NODE 3 | 120 | RIGHT | AVAILABLE | - | - | 35.6582,139.7464 | - | - |

FIG.12B

AT A DISTANCE OF 170 METERS, TURN RIGHT. A DOWN ESCALATOR IS AN INDICATION OF A TURNING POINT. ON THE WAY, BRAILLE BLOCKS ARE ON THE RIGHT.

FIG.13A

| MAP INFORMATION ITEM/ NODE NAME | DISTANCE TO NEXT NODE | NEXT TURNING DIRECTION | NOTIFI- CATION POINT | DISTANCE FROM PRIOR NODE | TYPE | LONGITUDE AND LATITUDE | RIGHT OR LEFT | ORI- ENTA- TION |
|---|---|---|---|---|---|---|---|---|
| NODE 3 | 120 | RIGHT | AVAILABLE | - | - | 35.6582,139.7464 | - | - |
| WALL | - | - | - | - | LANDMARK ITEM | 35.6582,139.7465 | RIGHT | - |
| ELEVATOR | - | - | - | 50 | LANDMARK ITEM | 35.6582,139.7466 | LEFT | - |
| NODE 4 (DESTINATION) | 0 | - | AVAILABLE | - | - | 35.6582,139.7467 | - | - |

FIG.13B

AT A DISTANCE OF 120 METERS, THE DESTINATION IS ON THE RIGHT. ON THE WAY, AN ELEVETOR IS 50 METERS AHEAD ON THE LEFT.

FIG.14

| MAP-INFORMATION-ITEM NAME | TYPE | ORDER OF PRIORITY |
|---|---|---|
| SLOPE | ALERT ITEM | – |
| STEP | ALERT ITEM | – |
| PILLAR | ALERT ITEM | – |
| STAIRS | ALERT ITEM | – |
| BRAILLE BLOCKS | WALKING-ASSISTANCE ITEM | – |
| ESCALATOR | LANDMARK ITEM | 1 |
| ENTRANCE GATE WITH GUIDANCE SOUND SIGN | LANDMARK ITEM | 2 |
| GATE INFORMATION | LANDMARK ITEM | 3 |
| RESTROOM WITH GUIDANCE SOUND SIGN | LANDMARK ITEM | 4 |
| STORE | LANDMARK ITEM | 5 |
| ELEVATOR | LANDMARK ITEM | 6 |
| TEXTURE OF ROAD SURFACE | LANDMARK ITEM | 7 |
| WALL | LANDMARK ITEM | 8 |
| ... | ... | ... |

FIG.16A

| MAP INFORMATION ITEM/ NODE NAME | DISTANCE TO NEXT NODE | NEXT TURNING DIRECTION | NOTIFI- CATION POINT | DISTANCE FROM PRIOR NODE | TYPE | LONGITUDE AND LATITUDE | RIGHT OR LEFT | ORI- ENTA- TION |
|---|---|---|---|---|---|---|---|---|
| NODE 1 (STARTING POINT) | 150 | RIGHT | AVAILABLE | — | — | 35.6582,139.7457 | — | — |
| STAIRS | — | — | — | 20 | ALERT ITEM | 35.6582,139.7458 | CENTRAL | DOWN |
| PILLAR | — | — | — | 100 | ALERT ITEM | 35.6582,139.7459 | RIGHT | — |
| AUTOMATIC DOOR | — | — | — | 130 | LANDMARK ITEM | 35.6582,139.7460 | CENTRAL | — |
| NODE 2 | 170 | LEFT | AVAILABLE | — | — | 35.6582,139.7461 | — | — |

FIG.16B

STAIRS GOING DOWN ARE 20 METERS AHEAD IN A CENTRAL LOCATION.
A PILLAR IS 100 METERS AHEAD ON THE RIGHT.
AN AUTOMATIC DOOR IS 100 METERS AHEAD AT A CENTRAL LOCATION.

FIG.18A

| MAP INFORMATION ITEM/ NODE NAME | DISTANCE TO NEXT NODE | NEXT TURNING DIRECTION | NOTIFI- CATION POINT | DISTANCE FROM PRIOR NODE | TYPE | LONGITUDE AND LATITUDE | RIGHT OR LEFT | ORI- ENTA- TION |
|---|---|---|---|---|---|---|---|---|
| NODE 1 (STARTING POINT) | 150 | RIGHT | AVAILABLE | – | – | 35.6582,139.7457 | – | – |
| STAIRS | – | – | – | 20 | ALERT ITEM | 35.6582,139.7458 | CENTRAL | DOWN |
| PILLAR | – | – | – | 100 | ALERT ITEM | 35.6582,139.7459 | RIGHT | – |
| AUTOMATIC DOOR | – | – | – | 130 | LANDMARK ITEM | 35.6582,139.7460 | CENTRAL | – |
| NODE 2 | 170 | LEFT | AVAILABLE | – | – | 35.6582,139.7461 | – | – |

FIG.18B

AT A DISTANCE OF 30 METERS, TURN RIGHT. ON THE WAY, AN AUTOMATIC DOOR IS 10 METERS AHEAD AT A CENTRAL LOCATION.

FIG.20A

| MAP INFORMATION ITEM/ NODE NAME | DISTANCE TO NEXT NODE | NEXT TURNING DIRECTION | NOTIFI-CATION POINT | DISTANCE FROM PRIOR NODE | TYPE | LONGITUDE AND LATITUDE | RIGHT OR LEFT | ORI-ENTA-TION |
|---|---|---|---|---|---|---|---|---|
| NODE 1 (STARTING POINT) | 150 | RIGHT | AVAILABLE | - | - | 35.6582,139.7457 | - | - |
| STAIRS | - | - | - | 20 | ALERT ITEM | 35.6582,139.7458 | CENTRAL | DOWN |
| PILLAR | - | - | - | 100 | ALERT ITEM | 35.6582,139.7459 | RIGHT | - |
| AUTOMATIC DOOR | - | - | - | 130 | LANDMARK ITEM | 35.6582,139.7460 | CENTRAL | - |
| NODE 2 | 170 | LEFT | AVAILABLE | - | - | 35.6582,139.7461 | - | - |

FIG.20B

AN AUTOMATIC DOOR IS 10 METERS AHEAD IN A CENTRAL LOCATION.
A PILLAR IS 20 METERS BEHIND ON THE RIGHT.
STAIRS GOING DOWN ARE 100 METERS BEHIND AT A CENTRAL LOCATION.

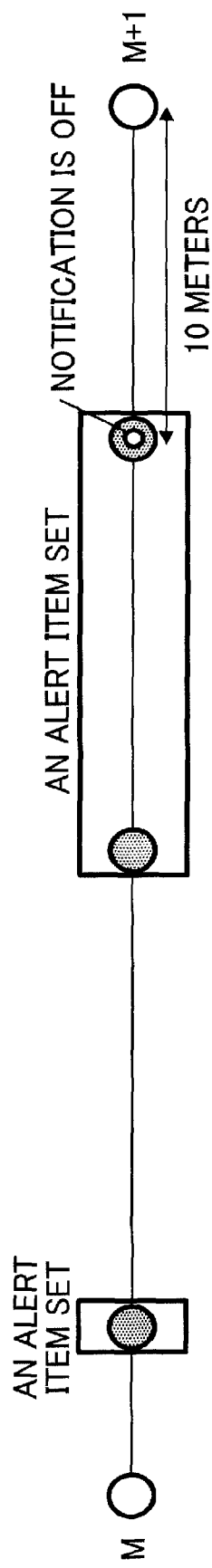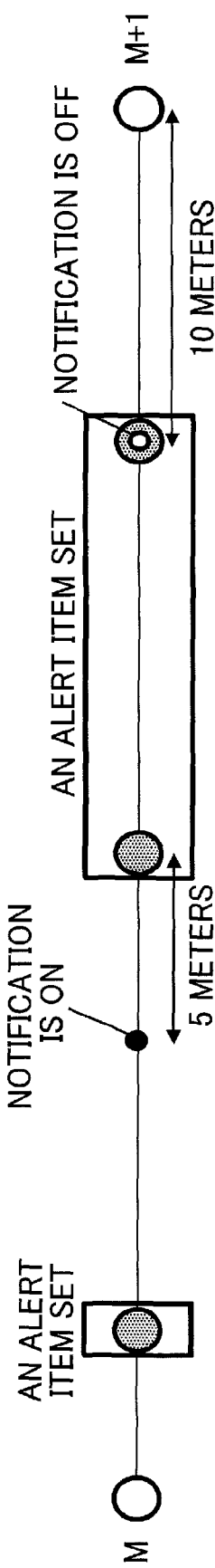

FIG.25A

| MAP INFORMATION ITEM/ NODE NAME | DISTANCE TO NEXT NODE | NEXT TURNING DIRECTION | NOTIFI- CATION POINT | DISTANCE FROM PRIOR NODE | TYPE | LONGITUDE AND LATITUDE | RIGHT OR LEFT | ORI- ENTA- TION |
|---|---|---|---|---|---|---|---|---|
| NODE M | 40 | RIGHT | AVAILABLE | – | – | 35.6582,139.7457 | – | – |
| STAIRS | – | – | – | 10 | ALERT ITEM | 35.6582,139.7458 | CENTRAL | DOWN |
| STAIRS | – | – | – | 14 | ALERT ITEM | 35.6582,139.7459 | CENTRAL | UP |
| STEP | – | – | – | 24 | ALERT ITEM | 35.6582,139.7460 | CENTRAL | UP |
| STAIRS | – | – | – | 30 | ALERT ITEM | 35.6582,139.7461 | CENTRAL | DOWN |
| AUTOMATIC DOOR | – | – | – | 38 | LANDMARK ITEM | 35.6582,139.7462 | RIGHT | – |
| NODE M+1 | 170 | LEFT | AVAILABLE | – | – | 35.6582,139.7463 | – | – |

FIG.25B (AT A POINT OF NODE M)
AT A DISTANCE OF 40 METERS, TURN RIGHT. AN AUTOMATIC DOOR ON THE RIGHT IS AN INDICATION OF A TURNING POINT.
ON THE WAY, STAIRS GOING DOWN FOLLOWED BY STAIRS GOING UP ARE CONSECUTIVELY 10 METERS AHEAD.

(AT A POINT OF 5 METERS BEFORE THE STAIRS GOING UP)
AT A DISTACE OF 21 METERS, TURN RIGHT. AN AUTOMATIC DOOR ON THE RIGHT IS AN INDICATION OF A TURNING POINT.
ON THE WAY, STAIRS GOING UP FOLLOWED BY STAIRS GOING DOWN ARE CONSECUTIVELY 5 METERS AHEAD.

NAVIGATION SYSTEM, APPARATUS AND METHOD FOR GENERATING NAVIGATION MESSAGE

CROSS-REFERENCE TO RELATED APPLICATION

The present application claims priority under 35 U.S.C. § 119 to Japanese Patent Application No. 2018-198447 filed on Oct. 22, 2018, the entire content of which is incorporated herein by reference in its entity.

BACKGROUND OF THE INVENTION

1. Field of the Invention

The present disclosure relates to a navigation system, an apparatus and a method for generating a navigation message.

2. Description of the Related Art

In getting to a destination, a visually impaired person may walk indoors or not with the aid of a sighted person or a guide dog. In some cases, a navigation system or the like may be used through a cellular phone or a smartphone. For example, Japanese Laid-open Patent Publication No. 2001-128149 (Patent document 1) discloses a system for voice guidance in which a terminal carried by the visually impaired person is communicatively connected to a device used by a guide person.

SUMMARY OF THE INVENTION

Embodiments of the present disclosure provide an apparatus, a system and a method so as to provide guidance properly.

A first aspect of an embodiment provides the following apparatus:

An apparatus for generating a navigation message for a person traveling on foot, including:
a route generating unit configured to generate a route, the route including:
nodes from a starting point to a destination, the nodes indicating the starting point, the destination, and at least one turning points therebetween,
one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person; and
a navigation message generating unit configured to generate a navigation message about the generated route based on the generated route, the one or more map information items of the generated route, and an order of priority in which map information items are presented,
wherein the navigation message generating unit is configured to include, in the navigation message, a description about a section of the generated route, such that,
when an end node at an end of the section is located within a predetermined distance from a given object existing along the section, the description includes a map information item associated with the given object as an indication of the end node,
when the given section has one or more map information items classified as the alert item or the walking-assistance item, the description includes the one or more map information items classified as the alert item or the walking-assistance item, and
when the given section has no map information items classified as either the alert item or the walking-assistance item, and has one or more map information items classified as the landmark item, the description includes a map information item selected, from the one or more map information items classified as the landmark item, in the order of priority in which map information items are presented.

A second aspect of the embodiment provides the following system:

A navigation system, including:
a navigation message generating apparatus for generating a navigation message for a person traveling on foot, including:
a route generating unit configured to generate a route, the route including:
nodes from a starting point to a destination, the nodes indicating the starting point, the destination, and one or more turning points therebetween,
one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person; and
a navigation message generating unit configured to generate a navigation message about the generated route based on the generated route, the one or more map information items of the generated route, and an order of priority in which map information items are presented,
a navigation message output apparatus for outputting a navigation message for a person traveling on foot; including:
a present location obtaining unit configured to obtain a present location of a person;
a direction obtaining unit configured to obtain a direction of the person;
a notification decision unit configured to obtain the route generated by the navigation message generating apparatus, and determine the timing of presenting the navigation message based on the obtained route, and the obtained present location and direction;
an output unit configured to send a notification to the person, and output the navigation message generated by the navigation message generating apparatus, and
wherein the navigation message generating unit is configured to include, in the navigation message, a description about a section of the generated route, such that,
when an end node at an end of the section is located within a predetermined distance from a given object existing along the section, the description includes a map information item associated with the given object as an indication of the end node,
when the given section has one or more map information items classified as the alert item or the walking-assistance item, the description includes the one or more map information items classified as the alert item or the walking-assistance item, and
when the given section does not have map information items classified as either the alert item or the walking-assistance item, and has one or more map information items classified as the landmark item, the description includes map information items selected, from the one or more map information items classified as the landmark item, in the order of priority in which map information items are presented.

A third aspect of an embodiment provides the following method:

A method for generating a navigation message for a person traveling on foot, including:

generating a route, the route including:

nodes from a starting point to a destination, the nodes indicating the starting point, the destination, and one or more turning points therebetween, one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person; and generating a navigation message about the generated route based on the generated route, the one or more map information items of the generated route, and an order of priority in which map information items are presented, wherein the generating a navigation message includes generating, in the navigation message, a description about a section of the generated route, such that, when an end node at an end of the section is located within a predetermined distance from a given object existing along the section, the description includes a map information item associated with the given object as an indication of the end node, when the given section has one or more map information items classified as the alert item or the walking-assistance item, the description includes the one or more map information items classified as the alert item or the walking-assistance item, and when the given section does not have map information items classified as either the alert item or the walking-assistance item, and has one or more map information items classified as the landmark item, the description includes map information items selected, from the one or more map information items classified as the landmark item, in the order of priority in which map information items are presented.

BRIEF DESCRIPTION OF THE DRAWINGS

FIG. 4 is a diagram illustrating an example of path information;

FIG. 5 is a diagram illustrating an example of map information items;

FIG. 6 is a diagram illustrating an example of a route generated by a route generating unit;

FIGS. 11A and 11B are diagrams for explaining an example of generating a navigation message with respect to a section between a node 1 and a node 2;

FIGS. 12A and 12B are diagrams for explaining an example of generating a navigation message with respect to a section between the node 2 and a node 3;

FIGS. 13A and 13B are diagrams for explaining an example of generating a navigation message with respect to a section between the node 3 and a node 4;

FIG. 14 is a diagram illustrating an example of an order of priority in which map information items are presented;

FIGS. 16A and 16B are diagrams for explaining an example of generating a surrounding-information description with respect to the section between the node 1 and the node 2;

FIGS. 18A and 18B are diagrams for explaining an example of updating a navigation message with respect to the section between the node 1 and the node 2 (in a case where a present location is 120 meters ahead from the node 1);

FIGS. 20A and 20B are diagrams for explaining an example of an updated surrounding-information description with respect to the section between the node 1 and a node 2 (in a case where a present location is 120 meters ahead from the node 1);

FIGS. 24A and 24B are diagrams for explaining a notification point of a navigation message;

FIGS. 25A and 25B are diagrams for explaining an example of generating a navigation message with respect to a section between a node M and a node M+1;

DETAILED DESCRIPTION OF THE EMBODIMENTS

Explanation will be hereinafter provided for embodiments with reference to the drawings. In the embodiments, a navigation apparatus for providing a visually impaired person with guidance on a route taken in getting from a starting point to a destination is described. As an example of a use case, during walking, the following is considered: a visually impaired person does not need to operate a navigation apparatus in his/her pocket or bag, but receives only a notification based on his/her location information. Voice guidance is provided for the visually impaired person in a case where the visually impaired person who has received the notification stops walking to operate the navigation apparatus, which is taken from the pocket or the bag. Note that by way of example, the embodiments each provide a case where the navigation apparatus gives the visually impaired person voice guidance, but the navigation apparatus may give other persons traveling on foot voice guidance. For example, such persons include persons who do not easily walk compared to healthy working people, including aged persons, children or the like.

First Embodiment

<Functional Configuration of Navigation Apparatus>

Figure 1:
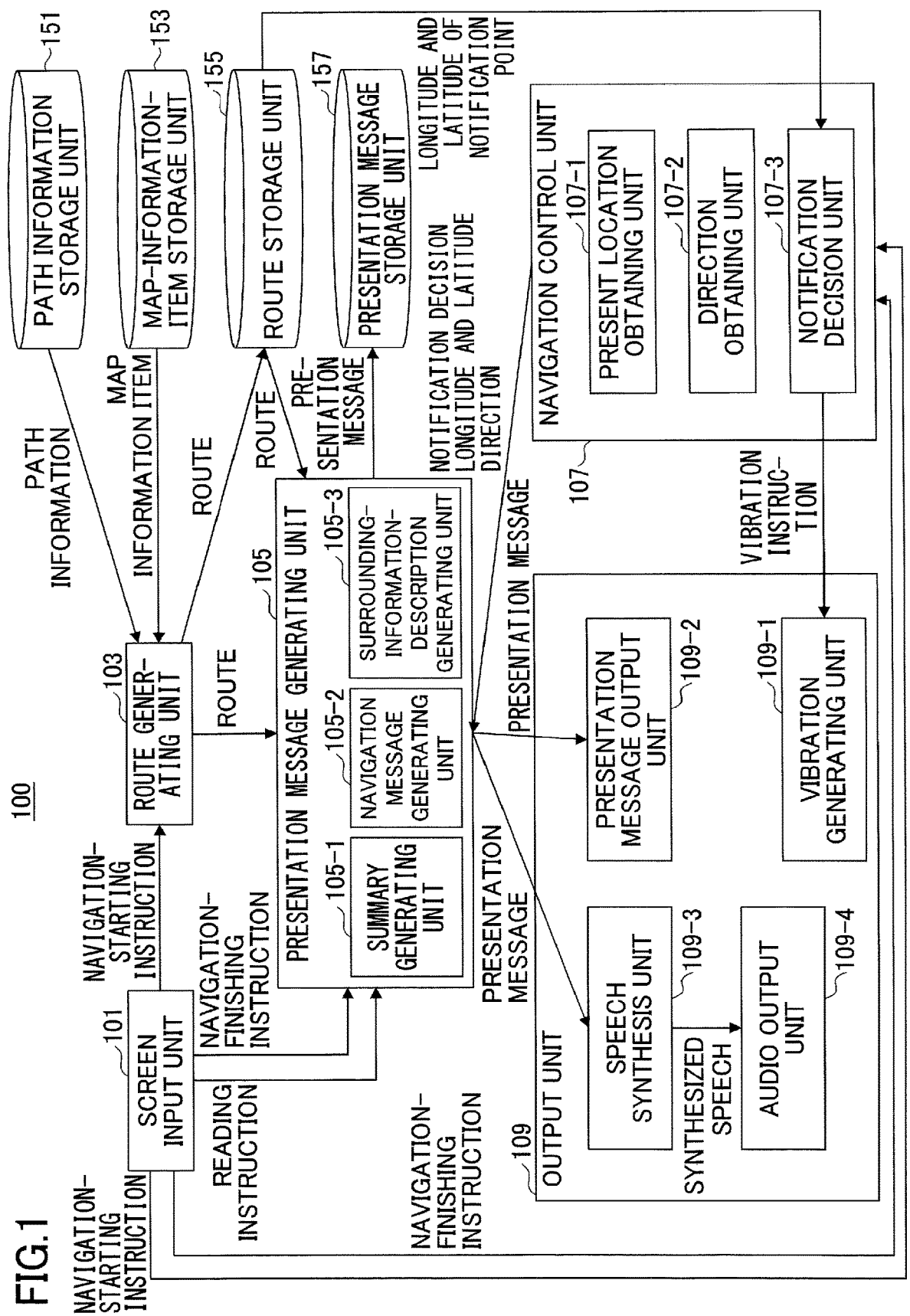
FIG. 1 is a diagram illustrating an example of a functional configuration of a navigation apparatus according to a first embodiment of the present invention.

FIG. 1 is a diagram illustrating an example of a functional configuration of a navigation apparatus 100 according to a first embodiment of the present invention. The navigation apparatus 100 is an apparatus that generates a presentation message, including a navigation message for a person traveling on foot, sends a notification to a visually impaired person via vibration as needed, and provides voice guidance in response to receiving an instruction from the visually impaired person.

Figure 2:
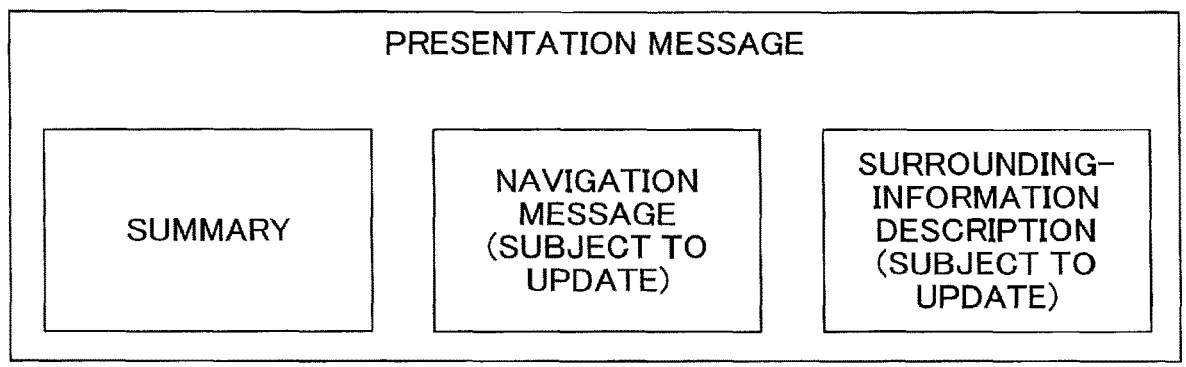
FIG. 2 is a diagram illustrating an example of a presentation message generated by the navigation apparatus.

FIG. 2 is a diagram illustrating an example of a presentation message generated by the navigation apparatus 100. The presentation message generated by the navigation apparatus 100 may include a summary and a surrounding-information description, in addition to a navigation message. The summary is a brief statement for presenting a route such as a distance from a starting point to a destination, a direction with respect to the starting point and the destination, and the number of turning points between the starting point and the destination. In a case where the starting point, the turning point and the destination are each represented by a node, the navigation message is a message for presenting a distance from a certain node to the next node, map information item(s) existing along a section to the next node, and the like. The surrounding-information description is an account of map information item(s) existing around a present location. The map information item includes a map-information-item name indicating a name of an object relating to a slope or a step existing along a path connecting the nodes, a type associated with the map-information-item name (as described in detail below, the above type includes an alert item indicating that the object presents danger to the person, a walking-assistance item indicating that the object serves to assist walking, a landmark item indicating that the object is perceivable by the person with a sense enabled during walking, and the like), and the like. The navigation message and the surrounding-information description are updated based on a present location of the person.

As illustrated in FIG. 1, the navigation apparatus 100 includes functional units that include a screen input unit 101, a route generating unit 103, a presentation message generating unit 105, a navigation control unit 107, and an output unit 109. The navigation apparatus 100 also includes storage units that include a path information storage unit 151, a map-information-item storage unit 153, a route storage unit 155, and a presentation message storage unit 157. The presentation message generating unit 105 includes a summary generating unit 105-1, a navigation message generating unit 105-2 and a surrounding-information-description generating unit 105-3. The navigation control unit 107 includes a present location obtaining unit 107-1, a direction obtaining unit 107-2 and a notification decision unit 107-3.

The output unit 109 includes a vibration generating unit 109-1, a presentation message output unit 109-2, a speech synthesis unit 109-3 and an audio output unit 109-4.

The screen input unit 101 always stands ready to receive an input instruction from a user such as a visually impaired person. When receiving an instruction of a starting point and a destination as well as starting navigation, the screen input unit 101 generates an instruction to cause the route generating unit 103 to generate text information of names in terms of the starting point and the destination (hereafter, the text information relating to a starting point name is referred to as a "starting point," and the text information relating to a destination name is referred to as a "destination"), as well as a route taken in getting from the starting point to the destination. The screen input unit 101 also outputs the generated instruction as a navigation-starting instruction. When receiving an instruction to finish navigation, the screen input unit 101 generates an instruction to cause the presentation message generating unit 105 to finish generating a presentation message, and outputs the generated instruction as a navigation-finishing instruction. When receiving an instruction to read a presentation message, the screen input unit 101 generates an instruction to cause the presentation message generating unit 105 to output the presentation message via the output unit 109, and outputs the generated instruction as a reading instruction.

The route generating unit 103, whose input includes the navigation-starting instruction from the screen input unit 101, path information from the route information storage unit 151 and map information item(s) from the map-information-item storage unit 153, outputs a route taken in getting from a starting point to a destination, as well as map information item(s) of the route. Specifically, when receiving a navigation-starting instruction including a starting point and a destination from the screen input unit 101, the route generating unit 103 generates a route taken in getting from the starting point to the destination with reference to the route information storage unit 151 for storing path information as well as the map-information-item storage unit 153 for storing map information items. Also, the route generating unit 103 stores the route and map information item(s) about the route in the route storage unit 155. The route may include a route having a shortest traveling-distance, a route having the smallest number of turning points, or the like. In the present embodiment, the route storage unit 155 stores nodes existing along the route from the starting point to the destination, as well as map information item(s) of the route. The generated route is also outputted to the presentation message generating unit 105. Note that the map information items are each associated with a corresponding map-information-item name, and an order of priority in which map information items are presented to the user is preliminarily set.

The presentation message generating unit 105 includes the summary generating unit 105-1, the navigation message generating unit 105-2, and the surrounding-information-description generating unit 105-3. The presentation message generating unit 105, whose input includes a route generated by the route generating unit 103 as well as map information item(s) of the route, outputs a presentation message (text information) including a summary, a navigation message and a surrounding-information description. Also, the presentation message generating unit 105, whose input includes the route stored in the route storage unit 155 and map information item(s) of the route, as well as a notification decision, a present location and a direction that are obtained from the navigation control unit 107, updates a navigation message and a surrounding-information description, and outputs the updated navigation message and surrounding-information description. Also, the presentation-message generating unit 105, whose input includes a reading instruction from the screen input unit 101, obtains a presentation message from the presentation message storage unit 157, and outputs the presentation message. Further, the presentation message generating unit 105, whose input includes a navigation-finishing instruction from the screen input unit 101, finishes generating the presentation message. Specifically, the presentation message generating unit 105 generates the presentation message, including the summary, the navigation message and the surrounding-information-description, based on a route generated by the route generating unit 103, map information item(s) of the route, and a predefined order of priority in which map information items are presented. Also, when the navigation control unit 107 determines that a notification is needed to be sent to a user, the presentation message generating unit 105 updates the navigation message and the surrounding-information description based on a present location and a direction received from the navigation control unit 107.

The summary generating unit 105-1, whose input includes a route generated by the route generating unit 103, outputs a summary. Specifically, the summary generating unit 105-1 generates the summary, including a distance from the starting point to the destination, a direction, and the number of turning points, based on the route generated by the route generating unit 105-1. The process of generating the summary will be described below.

The navigation message generating unit 105-2, whose input includes a route generated by the route generating unit 103, and map information item(s) of the route, outputs a navigation message. Also, the navigation message generating unit 105-2, whose input includes a route stored in the route storage unit 155 and map information item(s) of the route, as well as a notification decision, a present location and a direction that are obtained from the navigation control unit 107, updates the navigation message, and outputs the updated navigation message. Specifically, the navigation message generating unit 105-2 generates the navigation message, including a distance to the next node and map information item(s) existing along a section to the next node, based on the route generated by the route generating unit 103, the map information item(s) of the route, and the order of priority in which map information items are presented. As described in detail below, the order of priority in which map information items are presented is preliminarily set based on an alert level of object as to whether the object used in the guidance presents danger to the person, or a perception ability as to whether the object used in the guidance is perceptible through a sense of hearing. In such a manner, the navigation message can include appropriate information to the person. Note that, without a limitation of the sense of hearing, the order of priority may be set in consideration of at least one of the following sense enabled during walking: a haptic sense, a temperature sense, a pain sense, a vibration sense, a vision sense, a smell sense, or vestibular sensation (balance sense). The above order of priority is set for including appropriate information in a navigation message even in a case where message words are limited. Alternatively, the above order of priority is set for including appropriate information at the beginning of a navigation message even in a case where a navigation message has a long-form description. In this description, the appropriate information includes information relating to an object that presents danger to the person, or/and information relating to an object that physically serves to assist walking. As described below, when the navigation control unit 107 detects a change in present locations or directions, the navigation message generating unit 105-2 obtains a present location and a direction from the navigation control unit 107, and updates the navigation message. The process of generating and updating the navigation message will be described below.

The surrounding-information-description generating unit 105-3, whose input includes a route generated by the route generating unit 103, and map information item(s), outputs a surrounding-information description. Also, the surrounding-information-description generating unit 105-3, whose input includes the route stored in the route storage unit 155, and map information item(s) of the route, as well as a notification decision, a present location and a direction that are obtained from the navigation control unit 107, updates the surrounding-information description, and outputs the updated surrounding-information description. The surrounding-information-description generating unit 105-3 generates the surrounding-information description, including map information item(s) existing around the present location, based on the route generated by the route generating unit 103, and the map information item(s). When the navigation control unit 107 detects a change in present locations or directions, the surrounding-information-description generating unit 105-3 obtains a present location and a direction from the navigation control unit 107, and updates the navigation message. The process of generating and updating the surrounding-information description will be described below.

The presentation message generating unit 105 stores the generated presentation message in the presentation message storage unit 157. When receiving a notification decision from the navigation control unit 107, the presentation message generating unit 105 retrieves a presentation message from the presentation message storage unit 157 accordingly, and then outputs the presentation message to the presentation message output unit 109-2. Also, when receiving a reading instruction from the screen input unit 101, the presentation message generating unit 105 retrieves a presentation message from the presentation message storage unit 157 accordingly, and outputs the presentation message to the speech synthesis unit 109-3. Further, when receiving a navigation-finishing instruction from the screen input unit 101, the presentation message generating unit 105 finishes generating the presentation message accordingly.

The navigation control unit 107 includes the present location obtaining unit 107-1, the direction obtaining unit 107-2, and the notification decision unit 107-3. The navigation control unit 107, whose input includes a navigation-starting instruction and a navigation-finishing instruction from the screen input unit 101, outputs a present location and a direction of the visually impaired person, as well as a notification decision for indicating the timing of presenting a navigation message. Upon receiving a navigation-starting instruction from the screen input unit 101, the navigation control unit 107 periodically outputs a present location and a direction of the visually impaired person to the presentation message generating unit 105 until a navigation-finishing instruction is received. Further, the navigation control unit 107 determines the timing of presenting a navigation message based on a route stored in the route storage unit 155, a present location and a direction of the visually impaired person.

The present location obtaining unit 107-1, whose input includes a navigation-starting instruction or a navigation-finishing instruction from the screen input unit 101, outputs a present location. The present location obtaining unit 107-1 periodically obtains a present location (e.g., latitude and longitude) of the visually impaired person, and outputs the present location to the notification decision unit 107-3. The present location obtaining unit 107-1 can obtain a present location via a GPS (Global Positioning System), for example. In detecting a change in present locations, the present location obtaining unit 107-1 outputs a present location to the presentation message generating unit 105 for updating a presentation message. In the present embodiment, as an example, assuming that a traveling distance is updated at 1-meter intervals in a case of walking at 1 meter per second, the "periodically" means 1-second intervals. Also, for example, the "in detecting a change in present locations" means a case where a distance of the difference between a most recently obtained location and a present location exceeds a predetermined threshold. In the present embodiment in which a traveling distance is updated at 1-meter intervals, for example, the predetermined threshold is 1 meter.

The direction obtaining unit 107-2, whose input includes a navigation-starting instruction or a navigation-finishing instruction from the screen input unit 101, outputs a direction. The direction obtaining unit 107-2 obtains a direction of the visually impaired person (e.g., orientation with respect to a traveling direction in which the visually impaired person travels), and outputs the direction to the notification decision unit 107-3. For example, the direction obtaining unit 107-2 predicts a traveling direction of the visually impaired person based on the change in present locations, and considers the predicted traveling direction as the direction of the visually impaired person. In detecting a change in directions, the direction obtaining unit 107-2 outputs a direction to the presentation message generating unit 105 for updating a presentation message. For example, the "in detecting a change in directions" means a case where an angle of the difference between a most recently obtained direction and a present direction exceeds a predetermined threshold. For example, assuming that such an angle is represented by a clock position (which is given from among the twelve hour positions in which the hands of a clock point), the predetermined threshold is 30 degrees that correspond to a 1-hour angle.

The notification decision unit 107-3, whose input includes a present location from the present location obtaining unit 107-1, a direction from the direction obtaining unit 107-2 and a route stored in the route storage unit 155, outputs a notification decision for indicating the timing of presenting a navigation message, as well as a vibration instruction. The notification decision unit 107-3 compares a present location of the visually impaired person, obtained by the present location obtaining unit 107-1, with a notification point (e.g., a location of each node, a point that is 10 meters before a given node except for a starting point) of the route. Also, the notification decision unit 107-3 determines if a present location of the visually impaired person is at a given notification point of the route. If the present location of the visually impaired person is at the given notification point of the route, the notification decision unit 107-3 determines that a notification is needed to be sent to the visually impaired person. In determining that a notification is needed to be sent to the visually impaired person, the notification decision unit 107-3 outputs a notification decision to the presentation message generating unit 105, and outputs a vibration instruction that is an instruction to cause the vibration generating unit 109-1 to vibrate.

The output unit 109 includes the vibration generating unit 109-1, the presentation message output unit 109-2, and the speech synthesis unit 109-3. The output unit 109, whose input includes a presentation message outputted from the presentation message generating unit 105, outputs a notification for outputting a presentation message, as well as a presentation message. In a case where the presentation message generating unit 105 outputs a presentation message to the speech synthesis unit 109-3 in accordance with a reading instruction, the presentation message in audio format is outputted via the audio output unit 109-4.

The vibration generating unit 109-1, whose input includes a vibration instruction from the notification decision unit 107-3, generates vibration. The vibration generating unit 109-1 generates vibration, e.g., with use of a vibration function of a smartphone, in accordance with a vibration instruction outputted when the notification decision unit 107-3 determines that a notification is needed to be sent to the visually impaired person. In such a manner, the visually impaired person can recognize the timing of receiving a navigation message through vibration. Thereby, the visually impaired person can input a reading instruction through the screen input unit 101.

The presentation message output unit 109-2, whose input includes a presentation message from the presentation message generating unit 105, outputs (displays) a presentation message received from the presentation message generating unit 105 onto a screen.

The speech synthesis unit 109-3, whose input includes a presentation message from the presentation message generating unit 105, generates a synthesized speech signal based on the presentation message received from the presentation message generating unit 105 in accordance with a reading instruction, and outputs the synthesized speech signal.

The audio output 109-4, whose input includes a synthesized speech signal from the speech synthesis unit 109-3, outputs the synthesized speech.

<Process of Navigation Apparatus>

Hereafter, the process operated by the navigation apparatus 100 is described.

Figure 3:
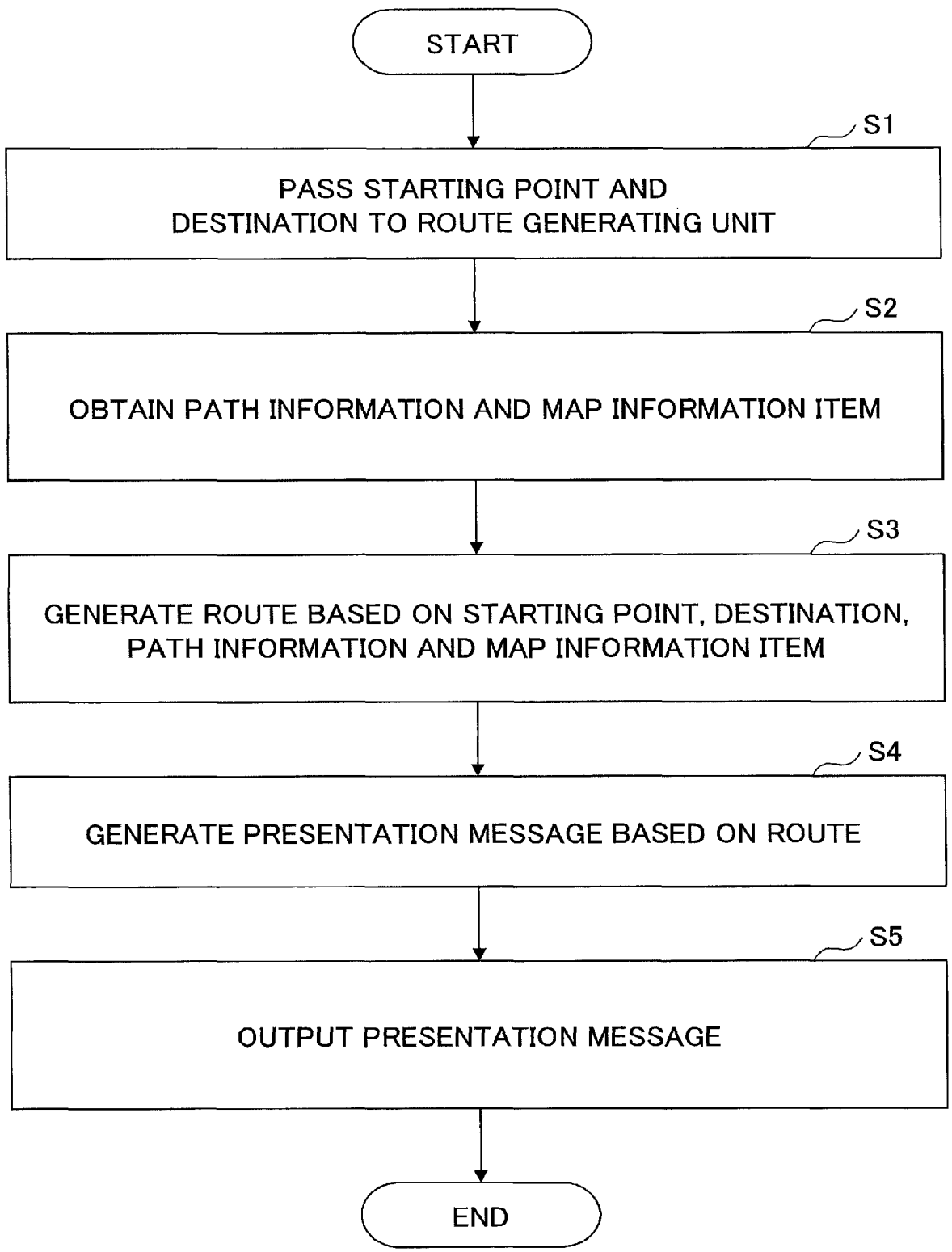
FIG. 3 is a flowchart (part 1) illustrating an example of a process operated by the navigation apparatus.

FIG. 3 is a flowchart illustrating an example of a process operated by the navigation apparatus 100. The flowchart of FIG. 3 illustrates a case where the navigation apparatus 100 performs first processing in generating and storing a presentation message in accordance with a navigation-starting instruction.

At step S1, the screen input unit 101 receives names of a starting point and a destination, and passes, to the route generating unit 103, a navigation-starting instruction that is an instruction for generating a route taken in getting from the starting point to the destination, including text information indicating the names of the starting point and the destination (hereafter, the text information of a starting point name is referred to as a "starting point", and the text information of a destination name is referred to as a "destination"). Note that as an input manner, a keyboard, or a sound input (e.g., in a case of converting an input voice into text information through voice recognition) may be used, or alternatively, other input manners may be used.

At step S2, based on the starting point and the destination, the route generating unit 103 obtains path information from the path information storage unit 151, and obtains map information item(s) from the map-information-item storage unit 153. FIG. 4 illustrates an example of path information. FIG. 5 illustrates an example of map information items. In an example of FIG. 4, the path information includes a path name, a starting point, a destination, latitude and longitude with respect to each of nodes located along a route taken in getting from the starting point to the destination. In an example of FIG. 5, the map information items each include a map-information-item name, a type of map information items, a line or dot, latitude and longitude, right or left, and orientation. The "type" of map information items is used for classifying map information items to be presented to the visually impaired person into a plurality of categories. In the present embodiment, each of the map information items is classified as at least one of an alert item indicating that the object presents danger to the person, a walking-assistance item indicating that the object serves to assist walking, and a landmark item indicating that the object is perceivable by the person with a sense enabled during walking. Note that the sense enabled during walking includes a sense of hearing, a haptic sense, a temperature sense, a pain sense, a vibration sense, a vision sense, a smell sense, vestibular sensation (balance sense), or the like. The "line or dot" means attribution of object, e.g., indicating a case where a given map information item exists at a certain position in a section between the nodes (which corresponds to the "dot"), or where a given map information item exists continuously in whole or in part in a section between the nodes (which corresponds to the "line"). Braille blocks or the like is an example of the line attribution. The "latitude and longitude" indicate location information indicative of a center of a place where a given map information item exists. The "right or left" means a side on which a given object exists when it is viewed from a predetermined direction. The "orientation" means a particular direction slanting from horizontal. Note that in the present embodiment, the map information items relate to objects located in an indoor area such as a station yard. However, they may relate to objects located in an outdoor area, such as pedestrian lights, crosswalks, bus stops, articles for emitting a sound, or/and articles for assisting a visually impaired person who walks, such as Braille blocks. At step S2, the route generating unit 103 obtains a path that matches both of the starting point and the destination, from the path information storage unit 151, and obtains map information item(s) existing along the path based on latitude and longitude of the path, from the map-information-item storage unit 153.

At step S3, the route generating unit 103 generates a route based on the starting point, the destination, the path information and the map information item(s). FIG. 6 illustrates an example of a route generated by the route generating unit 103. In an example of FIG. 6 in which a starting point, turning points and a destination are each represented as a node, the route includes nodes existing from the starting point to the destination, as well as map information items existing between the nodes. In FIG. 6, with respect to a "distance to the next node," a "next turning direction," a "distance from a prior node," "right or left" and "orientation," they are each calculated based on "latitude and longitude" with respect to a given node(s) or a given map information item(s), as well as a traveling direction obtained with use of the latitude and longitude. With respect to the "distance to the next node" and the "next turning direction", they are each involved at only a point of a node. With respect to the "distance from a prior node," the "right or left" and the "orientation," they are each involved at a point of a map information item. In FIG. 6, with respect to each map information item, in which the "distance from a prior node" indicates the mark "–," its attribution with respect to the "line or dot" in FIG. 5 indicates the line. This is because the map information item with respect to the line attribution continuously exists in whole or in part of a given section. In this example of FIG. 5, such a map information item is not involved with respect to the "distance to the next node" and the "distance from a prior node." Note that a "notification point" indicates a point where a notification is needed to be sent to the visually impaired person. In this example, at all points of nodes, the respective notifications are needed to be sent. The generated route is passed to the presentation message generating unit 105 by the route generating unit 103. The generated route is stored in the route storage unit 155.

Figure 8:
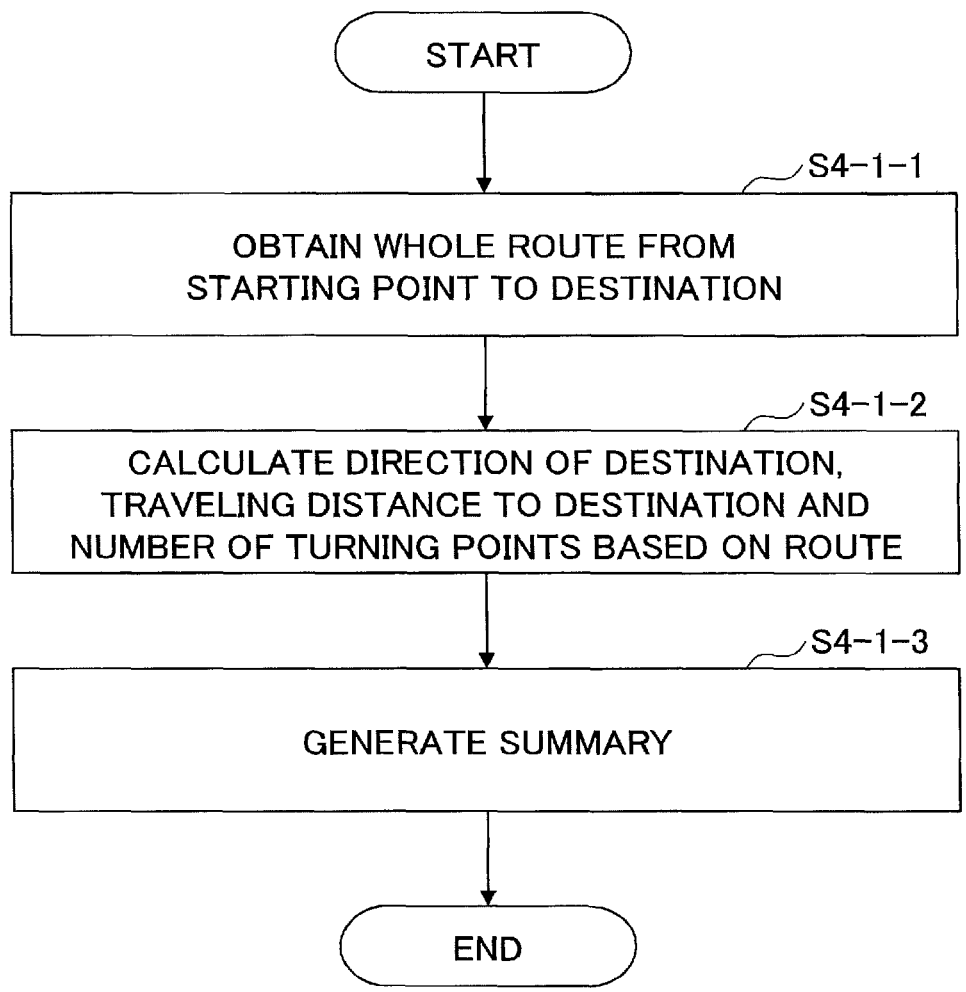
FIG. 8 is a flowchart illustrating an example of generating a summary.
Figure 10:
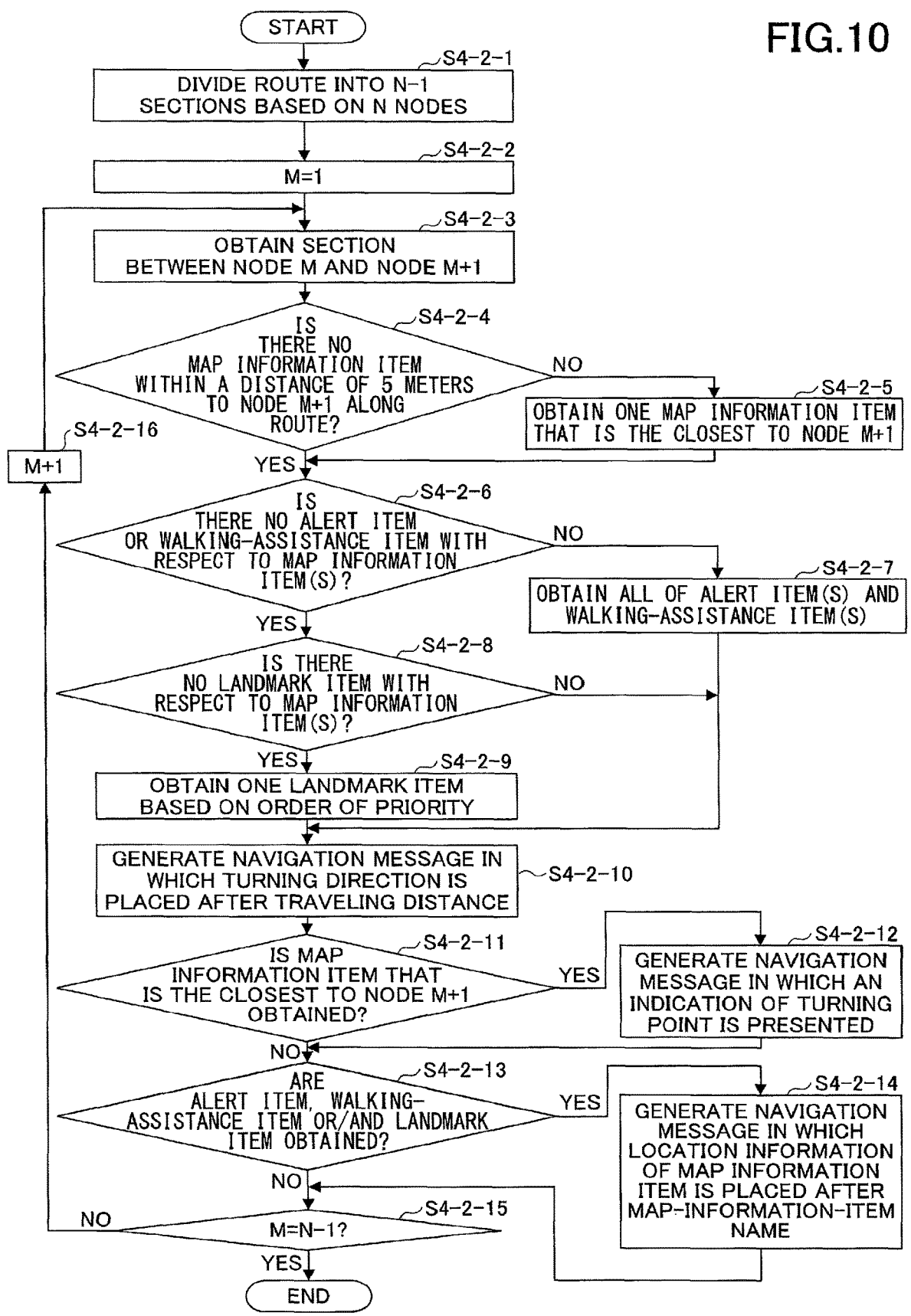
FIG. 10 is a flowchart illustrating an example of a process of generating a navigation message according to the first embodiment.
Figure 15:
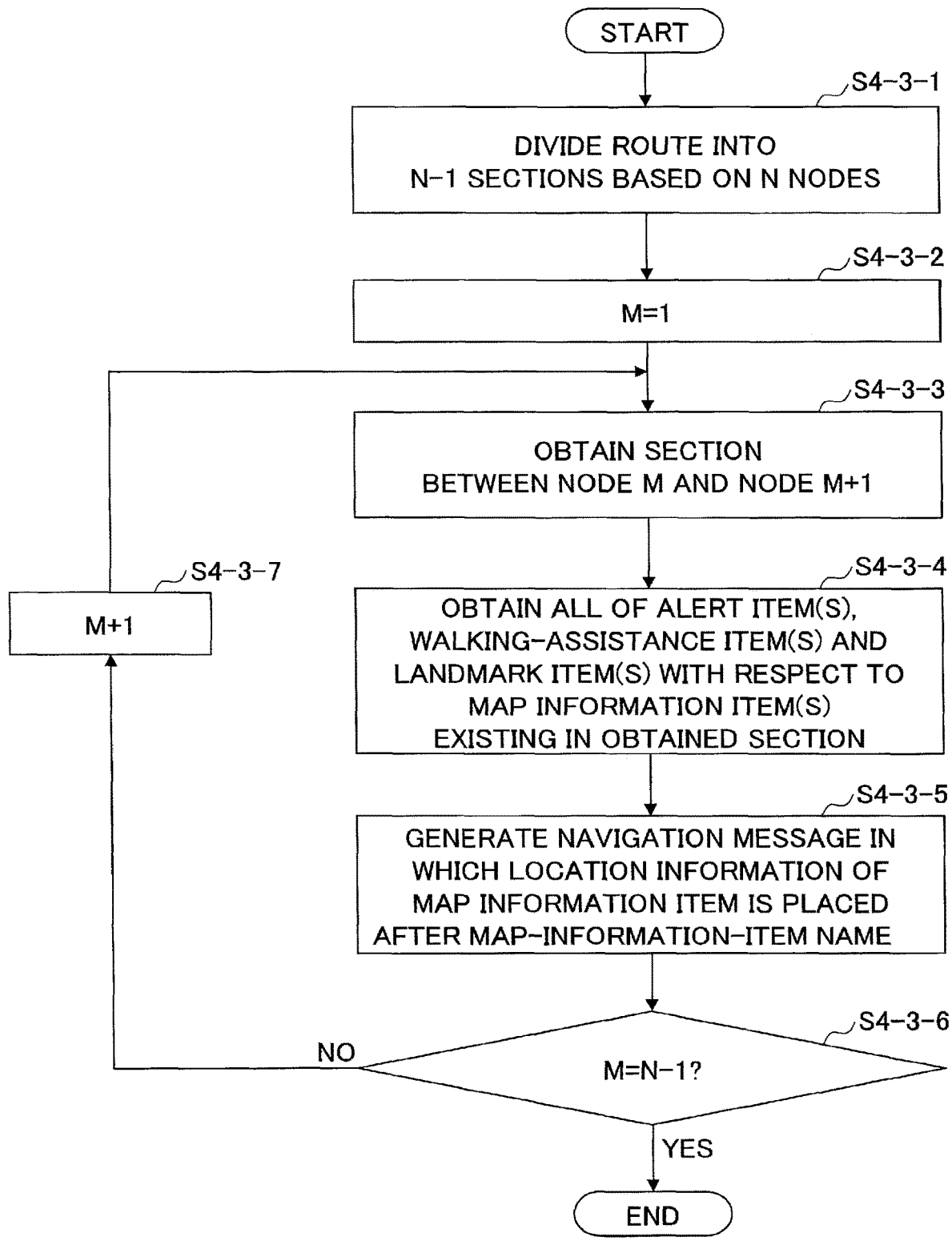
FIG. 15 is a flowchart illustrating an example of a process of generating a surrounding-information description.

At step S4, the presentation message generating unit 105 generates a presentation message based on the route. Note that in this description, the presentation message refers to a message that includes the summary, the navigation message and the surrounding-information description, as illustrated in FIG. 2. FIG. 8 is a flowchart of generating a summary. FIG. 10 is a flowchart of generating a navigation message. FIG. 15 is a flowchart of generating a surrounding-information description. These will be described below.

At step S5, the presentation message generating unit 105 passes the presentation message to the presentation message output unit 109-2, and outputs the presentation message via the presentation message output unit 109-2. The presentation message is outputted onto a screen of a device such as a smartphone. The presentation message is stored in the presentation message storage unit 157. Note that the presentation message may be directly outputted onto a screen of a device such as a smartphone. Instead of such a manner, in a case where a button indicating "screen reading" is displayed on a touch panel screen, the button may be pressed (the button displayed in the touch panel screen is touched) to receive an instruction to read the presentation message. Alternatively, a button for receiving an instruction to read an instruction message, or the like may be displayed while the presentation message is directly outputted. For example, such a button may be set so as to be fully displayed in an area for displaying a presentation message at a smartphone. In the above button manner, if the instruction to read a presentation message is received, an operation of the navigation apparatus 100 is performed as in the case of receiving the instruction to read a presentation message at the screen input unit 101.

Figure 7:
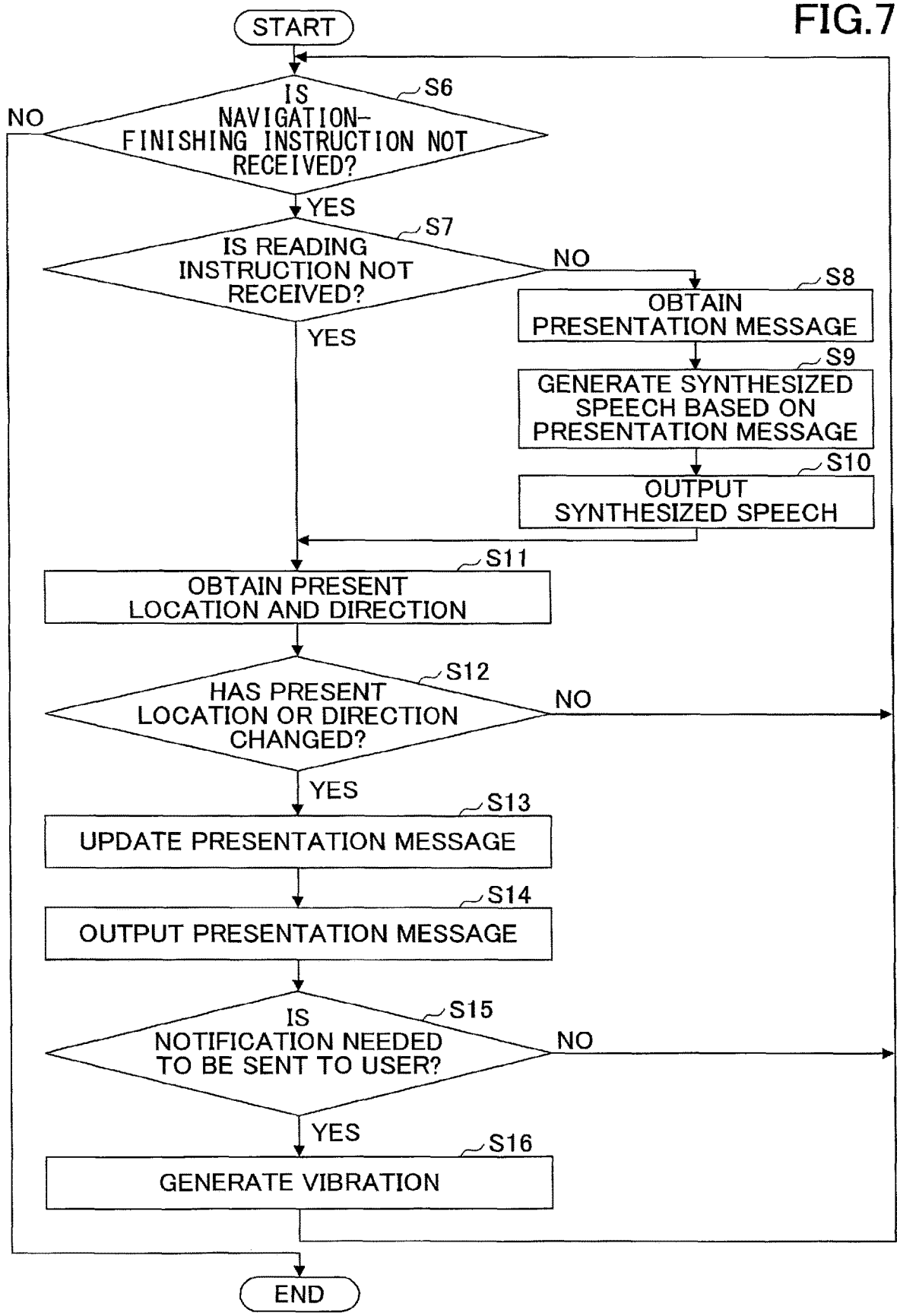
FIG. 7 is a flowchart (part 2) illustrating an example of a process operated by the navigation apparatus.

FIG. 7 is a flowchart illustrating an example of a process operated by the navigation apparatus 100. FIG. 7 illustrates a whole process operated by the navigation apparatus 100, after step S5 in FIG. 3, in order to provide voice guidance in accordance with a reading instruction, which is received after a notification is sent, or update an indication message based on location information.

At step S6, the presentation message generating unit 105 determines if a navigation-finishing instruction is not received from the screen input unit 101. For example, it is determined if a navigation-finishing button displayed on a screen is pressed, or if a navigation-finishing instruction is made using a voice command. If the navigation-finishing instruction is not received, the process proceeds to step S7, or if the navigation-finishing instruction is received, the process is finished.

At step S7, the presentation message generating unit 105 determines if a reading instruction of a presentation message is not received. For example, it is determined if an area for displaying a presentation message is not touched at a smartphone. If the reading instruction is received, the process proceeds to step S8, or if the reading instruction is not received, the process proceeds to step S11.

At step S8, the presentation message generating unit 105 obtains, from the presentation message storage unit 157, a presentation message based on the reading instruction, and passes the presentation message to the speech synthesis unit 109-3.

At step S9, the speech synthesis unit 109-3 generates a synthesized speech signal based on the presentation message received from the presentation message generating unit 105, and passes the synthesized speech signal to the audio output unit 109-4. Note that as a speech synthesis system constituting the speech synthesis unit 109-3, any synthesis system may be used.

At step S10, the audio output unit 109-4 outputs a synthesized speech into which the synthesized speech signal received from the speech synthesis unit 109-3 is converted. For example, the synthesized speech is outputted from a speaker, an earphone or a headphone of a smartphone. The process then proceeds to step S11.

At step S11, the present location obtaining unit 107-1 of the navigation control unit 107 periodically obtains a present location to output the present location to the notification decision unit 107-3. The direction obtaining unit 107-2 periodically obtains a direction to output the direction to the notification decision unit 107-3.

At step S12, the navigation control unit 107 determines if either of the present location or the direction, or both of them have changed. If both have not changed, the process returns to step S6, or if either has changed, the process proceeds to step S13.

Figure 17:
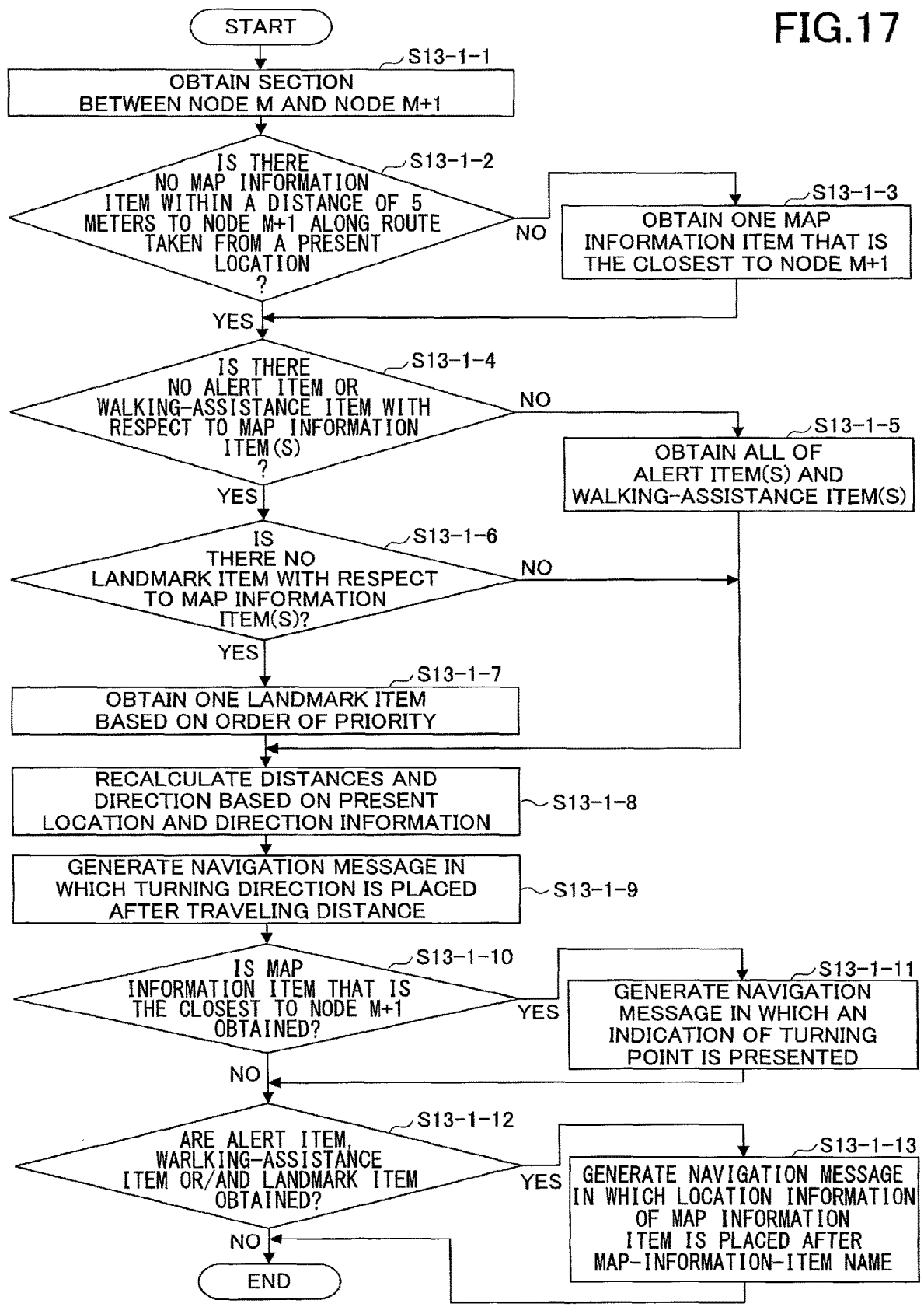
FIG. 17 is a flowchart illustrating an example of a process of updating a navigation message according to the first embodiment.
Figure 19:
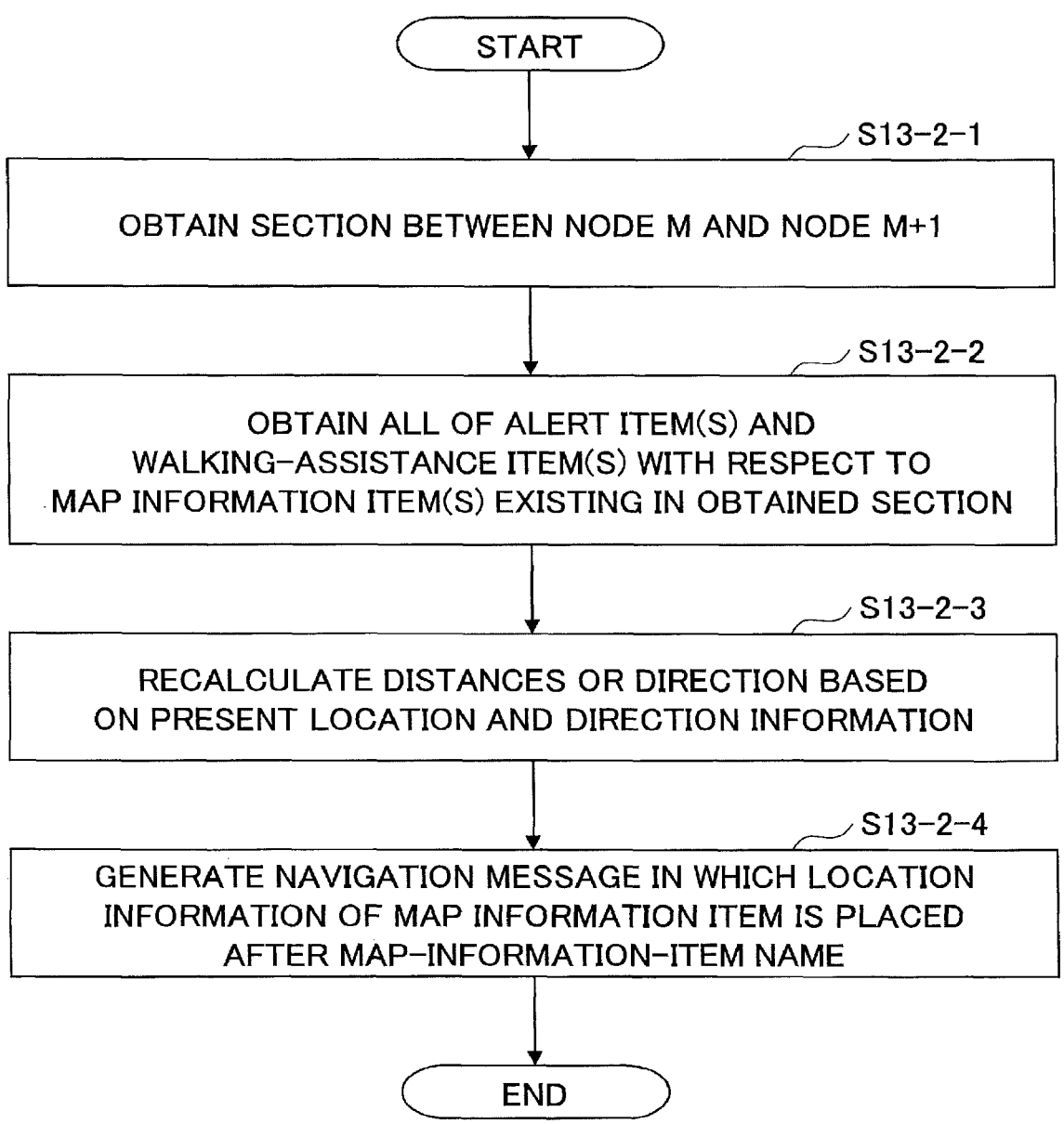
FIG. 19 is a flowchart illustrating an example of a process of updating a surrounding-information description.

At step S13, the navigation control unit 107 passes the changed present location or direction to the presentation message generating unit 105, and updates the presentation message. The navigation message and the surrounding-information description are the subject to update, as illustrated in FIG. 2. FIG. 17 is a flowchart of updating a presentation message. FIG. 19 is a flowchart of updating a surrounding-information description. These will be described below.

At step S14, the presentation message generating unit 105 passes the updated presentation message to the presentation message output unit 109-2 to output the presentation message via the presentation message output unit 109-2. The presentation message is stored in the presentation message storage unit 157.

At step S15, the notification decision unit 107-3 determines if a notification is needed to be sent to a user. Whether a notification is needed to be sent is determined based on latitude and longitude of a given node(s) existing along the route. As a point where a notification is needed to be sent, a location of each node, as well as points that are each 10 meters before a given node except for the starting point are used. Note that, with respect to the points that are each 10 meters before a given node, a distance to a given node may be changed as needed. In a case of comparing the present location with such a point where a notification is needed to be sent, if it is determined that a notification is needed to be sent (e.g., in a case where the user reaches a given node, and/or where the user reaches 10 meters before a given node except for the starting point), the process proceeds to step S16. If it is determined that the notification is not needed, the process returns to step S6.

At step S16, the notification decision unit 107-3 of the navigation control unit 107 sends a vibration instruction to the vibration generating unit 109-1, and then the vibration generating unit 109-1 generates vibration. For example, such vibration is implemented by a vibration function of a smartphone. Note that, aside from the visually impaired person, the notification may be sent to children with use of a sound signal. Alternatively, the notification may be sent to the visually impaired person with use of a light signal. For example, the vibration may stop after a lapse of a predetermined period. The vibration may stop by an operation by the visually impaired person via a screen. The vibration may stop when it is detected that the visually impaired person stops walking. After the vibration is generated, the process returns to step S6. The process at a subsequent step S6 continues until a navigation-finishing instruction is received.

Note that, in FIG. 7, a flowchart in a sequence that the navigation apparatus 100 follows is illustrated. However, a part of the process in FIG. 7 is concurrently operated. For example, the process of steps S11 to S16 and the process of steps S7 to S10 are concurrently operated.

<Generation of Summary>

Hereafter, the process of generating a summary by the summary generating unit 105-1 at step S4 in FIG. 3 is described. FIG. 8 is a flowchart illustrating an example of a process of generating a summary.

First, at step 4-1-1, the summary generating unit 105-1 obtains a whole route taken in getting from the starting point to the destination. As an example, FIG. 5 illustrates the obtained whole route.

Figures 9A, 9B:
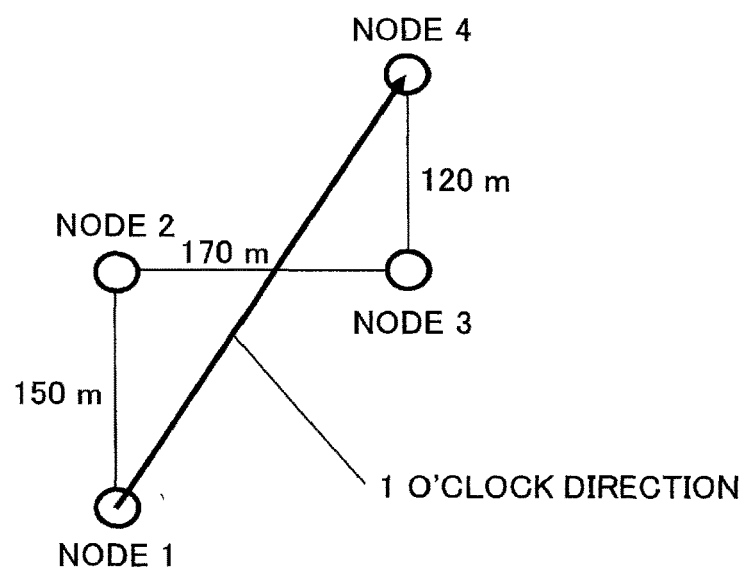
FIGS. 9A and 9B are diagrams for explaining an example of a generated summary.

Next, at step S4-1-2, the summary generating unit 105-1 calculates a direction of the destination, a traveling distance to the destination, and the number of turning points based on the obtained route. In the example of the route in FIG. 5, the route corresponds to a route as illustrated in FIG. 9A. In the example of the route in FIG. 9, an angle with respect to a starting point (e.g., node 1) and a destination (e.g., node 4) is calculated, and further, a direction of the destination is determined by matching the calculated angle with a clock position having a closest value that is selected from among the twelve clock positions. A traveling distance to the destination is calculated by adding each distance between the adjacent two nodes that are selected from among the nodes 1 to 4. The number of turning points is calculated by adding the number of nodes excluding the starting point and the destination.

At step S4-1-3, the summary generating unit 105-1 generates a summary based on the direction of the destination, the traveling distance to the destination, and the number of turning points. For example, with respect to the route in FIG. 5, as illustrated in FIG. 9B, the message "the destination is at a traveling distance of 440 meters from the starting position in a 1 o'clock direction. On the way, make two turns" is generated.

<Generation of Navigation Message>

Hereafter, the process of generating the navigation message by the navigation message generating unit 105-2 at step S4 in FIG. 3 is described. FIG. 10 is a flowchart illustrating an example of the process of generating the navigation message according to the first embodiment.

First, at step S4-2-1, the navigation message generating unit 105-2 divides the route into N−1 sections based on N nodes, e.g., a section between nodes 1 and 2, a section between nodes 2 and 3, . . . , a section between nodes M and M+1, . . . , a section between nodes N−1 and N (M<N, M is an integer of 1 or more, and N is an integer of 2 or more). In this description, one section refers to a section from one node to another node adjacent thereto, where another node exists next after the one node in the traveling direction.

At step S4-2-2, a parameter M indicating a section where a navigation message is generated is set to 1.

At step S4-2-3, the navigation message generating unit 105-2 obtains a section between the node M and the node M+1. For example, in the case of M=1, a section between the node 1 and the node 2 is obtained based on the route of FIG.

6, as illustrated in FIG. 11A. Note that, at a subsequent step S4-2-16, M is incremented. In the case of M=2, a section between the node 2 and the node 3 is obtained as illustrated in FIG. 12A. In the case of M=3, a section between the node 3 and the node 4 is obtained as illustrated in FIG. 13A. Note that in the present embodiment, assuming that a navigation message is generated at each turning point, explanation will be provided for a case where each section between the nodes located along the route is obtained, by way of example. However, the number of obtained sections is not limited to one, and multiple sections may be obtained.

At step S4-2-4, with reference to a distance from a prior node, the navigation message generating unit 105-2 determines if there is no map information item within a distance of 5 meters to the next node. If there is a map information item within a distance of 5 meters to the next node, the process proceeds to step S4-2-5, and then the navigation message generating unit 105-2 obtains one map information item that is the closest to the next node. If there is no map information item within a distance of 5 meters to the next node, the process proceeds to step S4-2-6. Note that, as a distance to the next node, around 5 meters are preferably used, but any value may be used as long as it is smaller than a distance (in the above example, 10 meters) between a given node and a notification point that is before the given node. The number of obtained map information items is not limited to one, and multiple map information items may be obtained. In a case of obtaining multiple map information items, the navigation message may be generated so as to present a relationship between the multiple map information items, such as a distance between an elevator and stairs. In FIG. 11A, because there is no map information item within a distance of 5 meters to the node 2, the process proceeds to step S4-2-6. In the example of FIG. 12A, because a distance from "escalator" to the next node is 2 meters, the process proceeds to step S4-2-5, and then the navigation message generating unit 105-2 obtains the map information item about the "escalator".

At step S4-2-6, with reference to a column of the type with respect to a given route, the navigation message generating unit 105-2 determines if there is no alert item or walking-assistance item with respect to each map information item. In the example of FIG. 11A, because "stairs" and a "pillar" each indicate the alert item, it is determined that alert items are present.

At step S4-2-6, if an alert item or a walking-assistance item is present, the process proceeds to step S4-2-7, and then the navigation message generating unit 105-2 obtains all of the alert item(s) and the walking-assistance item(s). In the example of FIG. 11A, the "step" and the "pillar" are obtained. At step S4-2-7, in a case of obtaining all of the alert item(s) and the walking-assistance item(s), the process proceeds to step S4-2-10.

At step S4-2-6, if there are no alert items and walking-assistance items, the process proceeds to step S4-2-8, and then the navigation message generating unit 105-2 determines if there is a landmark item. If there is no landmark item, the process proceeds to step S4-2-10, otherwise the process proceeds to step S4-2-9. In the example of FIG. 13A, because a "wall" and an "elevator" each indicate the type of landmark, the process proceeds to step S4-2-9.

At step S4-2-9, the navigation message generating unit 105-2 obtains one landmark item according to an order of priority in which map information items are presented. Note that the number of obtained landmark items is not limited to one, and multiple landmark items may be obtained. FIG. 14 illustrates an example of the order of priority in which map information items are presented. The mark "–" with respect to the order of priority indicates a map information item classified as an alert item or a walking-assistance item. Since such a map information item is included in a navigation message, the order of priority is not set. For this reason, with respect to each map information items classified as the landmark item, the order of priority is set. In a case where there are multiple landmark items located along a given route, a landmark item having a smallest number with respect to the order of priority, i.e., a landmark item having a highest order of priority, is selected from among the multiple landmark items. In the example of FIG. 14, in a case of selecting one landmark item from among two landmark items about a "wall" and an "elevator," existing along a section of the route, the "wall" has an eighth-order of priority, and the "elevator" has a sixth-order of priority. In this example, because the "elevator" takes priority over the "wall," the landmark item about the "elevator" is obtained. Note that in the present embodiment, the type of map information item (the alert item, the walking-assistance item, or the landmark item), or the order of priority in which map information items are presented may be set in consideration of a result of questionnaires for the visually impaired person. Alternatively, a dangerous object that may be stumbled on or be bumped during walking may indicate the alert item. An object providing information about a path or an object serving to assist walking may indicate the walking-assistance item. Other objects each may indicate the landmark item. The order of priority in which map information items are presented may be set according to a perception ability from hearing with respect to the object used in the guidance. With respect to a landmark item for emitting a sound that lets the person know a presence of the landmark item (e.g., in the case of an "escalator," the announcement "this is an up escalator" is made and includes an operating noise), it may have a high order of priority. Also, the classification of map information items or the order of priority in which landmark items are presented may be preliminarily set or changed in consideration of a user such as the visually impaired person.

At step S4-2-10, the navigation message generating unit 105-2 generates a message based on the route. In this description, the message in which a turning direction is placed after a traveling distance is generated. For example, the message "at a distance of 200 meters, turn right" is generated. Note that, the forward distance and the turn direction are not required to be arranged in a consecutive manner; the navigation message generating unit 105-2 may add word(s) between the traveling distance and the turning direction.

At step S4-2-11, the navigation message generating unit 105-2 determines whether to obtain a map information item within a distance of 5 meters to the next node. If such a map information item is obtained, the process proceeds to step S4-2-12, otherwise the process proceeds to step S4-2-13.

At step S4-2-12, the navigation message generating unit 105-2 generates a message in which the map information item within a distance of 5 meters to the next node is presented as an indication to find a turning point. For example, the message "a down escalator is an indication of a turning point" is generated.

At step S4-2-13, the navigation message generating unit 105-2 determines whether to obtain an alert item, a walking-assistant item or/and a landmark item. If such an item is obtained, the process proceeds to step S4-2-14, otherwise the process proceeds to step S4-2-15.

At step S4-2-14, the navigation message generating unit 105-2 generates a message based on the alert item, the walking-assistant item or/and the landmark item. For example, when obtaining alert item(s) or walking-assistant item(s), the navigation message generating unit 105-2 generates the message based on all of the obtained alert item(s) and walking-assistant item(s). Also, when obtaining one landmark item based on the order of priority, the navigation message generating unit 105-2 generates the message based on the obtained landmark item. As an example, the navigation message generating unit 105-2 generates the message in which location information of the map information item is placed after a corresponding map-information-item name. For example, the message "an automatic door is 50 meters ahead on the right" is generated. Note that, there being no limitation to such a form to arrange the map-information-item name and the location information consecutively, the navigation message generating unit 105-2 may add word(s) between the two.

At step S4-2-15, it is determined if M is equal to N−1, i.e., if navigation messages with respect to all sections are generated. If there is a section where a navigation message is not generated, the process proceeds to step S4-2-16. If navigation messages with respect to all sections are generated, the process is finished.

At step S4-2-16, a value of the parameter M is increased by one (which may be referred to as an increment hereafter), and then the process returns to step S4-2-3.

In the above flowchart, as an example, explanation has been provided for the case where, after obtaining all of the alert item(s) and the walking-assistance item(s) at step S4-2-7, the process proceeds to step S4-2-10. However, the process may proceed to step S4-2-8. In this case, given that, at step S4-2-8, a navigation message is generated based on the alert item(s), the walking-assistance item(s) and the landmark information, the navigation message may have a long-form description. In order to reduce a user's burden to listen to such a navigation message, if the alert item(s) and the walking-assistance item(s) are obtained, the navigation message is preferably generated based on the alert item(s) and the walking-assistance item(s) so as to have an appropriate amount of the navigation message.

FIGS. 11B, 12B and 13B illustrate examples of a generated message. In each figure, location information of a map information item is placed after a map-information-item name. Thereby, the map information item is easily recognized by the visually impaired person that wants to check the map information item and that considers it important. For example, given that the visually impaired person wants to check information about stairs only, if a map-information-item name is presented after location information of a map information item through voice guidance, the visually impaired person needs to check if the "stairs" are presented after the memorized location information of the map information item. On the other hand, in a case where a map-information-item name is presented first, the visually impaired person can memorize the location information presented after the "stairs" is announced, thereby easily recognizing necessary information. Also, in the present embodiment, a turning direction is placed after a traveling distance, thereby easily recognizing a whole route.

According to other rules of generating a navigation message, with respect to a map information item whose attribution with respect to the "line/dot" indicates the line, although location information of the map information item is not presented after a map-information-item name, only information about right or left or/and orientation is presented. For example, since the attribution with respect to the Braille blocks in FIG. 12A indicates the "line," such a map information item is not involved with respect to the "distance from a prior node". In such a manner, for example, the message "on the way, Braille blocks are on the left" as illustrated in FIG. 12B is generated, without including distance information.

Also, in a case where there are a plurality of map information items having a same map-information-item name and existing along a section between the nodes, e.g., in a case where the "stairs going down" are respectively 20 meters ahead, 30 meters ahead, and 40 meters ahead in a section from a certain node to the next node, the message is generated such that the number of map information items is placed after location information of the map information item that is followed by the map-information-item name. As an example, the message "on the way, stairs going down at 20 meters, 30 meters, and 40 meters ahead: 3 stairs going down in total" is generated. Note that, there is no limitation to such a form of arranging the map information item, the location information and the map information item name consecutively in the message; the navigation message generating unit 105-2 may add word(s) between the map-information-item name and the location information, as well as between the location information and the number of map information items.

In this description, assuming that a description of the message is presented at each turning point (node), the message presents map information item(s) existing along a section from a certain turning point to the next turning point. However, if a distance from a certain node to the next node is shorter than a distance between a notification point and a turning point, map information item(s) existing along a section from a certain node to the node after the next may be presented. For example, in a case where the notification point is 10 meters before a given turning point, and a distance between a node N and a node N+1 is 5 meters, a description of the message is generated so as to present two topics at the beginning of the description, along with presenting map information item(s) existing along the section from the node to the node after the next. As an example, the message "guidance on two topics: at a distance of 10 meters, turn right. On the way, at a distance of 3 meters, stairs going down are on the right. Next, at a distance of 5 meters, turn left. On the way, Braille blocks are on the left" is generated.

<Generation of Surrounding-Information Description>

Hereafter, the process of generating the surrounding-information description by the surrounding-information-description generating unit 105-3 at step S4 in FIG. 3 is described. FIG. 15 is a flowchart illustrating an example of generating the surrounding-information description.

First, at step S4-3-1, the surrounding-information-description generating unit 105-3 separates the route into N−1 sections based on N nodes, e.g., a section between nodes 1 and 2, a section between nodes 2 and 3, . . . , a section between nodes M and M+1, . . . , a section between nodes N−1 and N (M<N, M is an integer of 1 or more, and N is an integer of 2 or more). In this description, one section refers to a section from one node to another node adjacent thereto, where another node exists next after the one node in the traveling direction.

At step S4-3-2, the parameter M indicating a section where a surrounding-information description is generated is set to 1.

At step S4-3-3, the surrounding-information-description generating unit 105-3 obtains a section between the node M to the node M+1. For example, in the case of M=1, a section between the node 1 and the node 2 is obtained based on the route of FIG. 6, as illustrated in FIG. 16A. Note that at a subsequent step S4-3-7, the parameter M is incremented, so that other sections are obtained. Note that in the present embodiment, explanation will be provided for a case where a surrounding-information description is generated based on map information item(s) existing along a section between the nodes, by way of example. However, map information item(s) existing within a predetermined distance of a present location may be obtained for generating a surrounding-information description.

At step S4-3-4, the surrounding-information-description generating unit 105-3 obtains all of the alert item(s), the walking-assistance item(s) and the landmark item(s) existing in the section obtained by the surrounding-information-description generating unit 105-3. In an example of FIG. 16A, all items about "stairs", a "pillar" and an "automatic door" are obtained.

At step S4-3-5, the surrounding-information-description generating unit 105-3 generates a description in which location information of a map information item is placed after a map-information-item name. For example, the message "an automatic door is 50 meters ahead on the right" is generated. In such a manner, the map information items are placed in an order in which map information items are close from the front in the traveling direction. FIG. 16B illustrates an example of a generated description.

At step S4-3-6, it is determined if M is equal to N−1, i.e., if surrounding-information descriptions with respect to all sections are generated. If there is a section where a surrounding-information description is not generated, the process proceeds to step S4-3-7. If surrounding-information descriptions with respect to all sections are generated, the process is finished.

At step S4-3-7, the parameter M is incremented, and then process returns to step S4-3-3.

<Update of Navigation Message>

Hereafter, the process of generating the navigation message by the navigation message generating unit 105-2 at step S13 in FIG. 7 is described. FIG. 17 is a flowchart illustrating an example of a process of updating the navigation message according to the first embodiment.

First, at step S13-1-1, the navigation message generating unit 105-2 obtains a section between the node M existing immediately prior to a present location and the next node M+1 based on a given route. For example, in a case where the present location is between a node 1 and a node 2, as illustrated in FIG. 18A, a section between the node 1 and the node 2 is obtained based on the route of FIG. 6.

At step S13-1-2, with reference to a distance from a prior node, the navigation message generating unit 105-2 determines if there is no map information item within a distance of 5 meters to the next node. If there is a map information item within a distance of 5 meters to the next node, the process proceeds to step S13-1-3, and then the navigation message generating unit 105-2 obtains one map information item that is the closest to the next node. If there is no map information item within a distance of 5 meters to the next node, the process proceeds to step S13-1-4. Note that, as a distance to the next node, any threshold value may be used, except for 5 meters. The number of obtained map information items is not limited to one, and multiple map information items may be obtained. In the example of FIG. 18A, since there is no map information item within a distance of 5 meters to the next node, the process proceeds to step S13-1-4.

At step S13-1-4, with reference to a column of the type with respect to a given route, the navigation message generating unit 105-2 determines if there is no alert item or walking-assistance item with respect to each map information item. In the example of FIG. 18A, assuming that a present location is 120 meters ahead from the node 1, it is found that the present location is between the "pillar" and the "automatic door" with reference to a distance from the prior node. In such a manner, at this step, it is determined if there is no alert item or walking-assistance item with respect to map information item(s) existing after the "automatic door." In the example of FIG. 18A, because the "automatic door" indicates a landmark item, it is determined that there is no alert item or walking-assistance item.

At step S13-1-4, if there is an alert item or a walking-assistance item, the process proceeds to step S13-1-5, and then the navigation message generating unit 105-2 obtains all of the alert item(s) and the walking-assistance item(s). The process then proceeds to step S13-1-8.

At step S13-1-4, if there are no alert items and walking-assistance items, the process proceeds to step S13-1-6. At step S13-1-6, with respect to map information item(s) of the route taken from the present location, the navigation message generating unit 105-2 determines if there is a landmark item. If there is no landmark item, the process proceeds to step S13-1-8, otherwise the process proceeds to step S13-1-7. In the example of FIG. 18A, because there is the "automatic door" existing after the present location, the navigation message generating unit 105-2 determines if there is a landmark item, and then the process proceeds to step S13-1-7.

At step S13-1-7, the navigation message generating unit 105-2 obtains one landmark item in the order of priority in which map information items are presented. In the example of FIG. 18A, because only the "automatic door" existing after the present location indicates the landmark item, the landmark information about the "automatic door" is obtained.

At step S13-1-8, the navigation message generating unit 105-2 recalculates distances and orientation based on the present location and direction information. In the example of FIG. 18A, because the present location is 120 meters ahead from the node 1, a distance from the present location to the "automatic door" is obtained as 10 m=130 m−120 m. Also, a distance from the present location to the node 2 is obtained as 30 m=150 m−120 m.

At step S13-1-9, the navigation message generating unit 105-2 generates a message based on a given route. As an example, the navigation message generating unit 105-2 generates the message in which a turning direction is placed after a traveling distance. For example, the message "at a distance of 200 meters, turn right" is generated.

At step S13-1-10, the navigation message generating unit 105-2 determines whether to obtain a map information item within a distance of 5 meters to the next node. If such a map information item is obtained, the process proceeds to step S13-1-11, otherwise the process proceeds to step S13-1-12.

At step S13-1-11, the navigation message generating unit 105-2 generates a message in which the map information item within a distance of 5 meters to the next node is presented as an indication to find a turning point. For example, the message "a down escalator is an indication of a turning point" is generated.

At step S13-1-12, the navigation message generating unit 105-2 determines whether to obtain an alert item, a walking-assistance item or/and a landmark item. If such an item is obtained, the process proceeds to step S13-1-13, otherwise the process is finished.

At step S13-1-13, the navigation message generating unit 105-2 generates a message based on the alert item, the walking-assistance item or/and the landmark item. For example, when obtaining the alert item or the walking-assistance item, the navigation message generating unit 105-2 generates a message based on all of the obtained alert item(s) and walking-assistance item(s). Also, when obtaining one landmark item in the order of priority in which map information items are presented, the navigation message generating unit 105-2 generates a message based on the obtained landmark item. As an example, the navigation message generating unit 105-2 generates the message in which location information of a map information item is placed after a map-information-item name. For example, the message "an automatic door is 50 meters ahead on the right" is generated.

<Update of Surrounding-Information Description>

Hereafter, the process of generating the surrounding-information description by the surrounding-information-description generating unit 105-3 at step S13 in FIG. 7 is described. FIG. 19 is a flowchart illustrating an example of a process of updating the surrounding-information description.

At step S13-2-1, the surrounding-information-description generating unit 105-3 obtains a section between the node M existing immediately prior to a present location and the next node M+1, based on a given route. For example, in a case where the present location is between the node 1 and the node 2, as illustrated in FIG. 20A, a section between the node 1 and the node 2 is obtained based on the route of FIG. 6.

At step S13-2-2, the surrounding-information-description generating unit 105-3 obtains all of alert item(s), walking-assistance item(s) and landmark item with respect to map information item(s) existing in the obtained section. In an example of FIG. 20A, all items about "stairs", a "pillar" and an "automatic door" are obtained. In generating a surrounding-information description, all map information items existing along a section between the node 1 and the node 2 are the subject, unlike the case of generating the navigation message.

At step S13-2-2, the surrounding-information-description generating unit 105-3 recalculates distances and orientation based on a present location and direction information. In the example of FIG. 20A, because the present location is 120 meters ahead from the node 1, a distance from the present location to the "stairs" is obtained as −100 m=20 m−120 m (a minus in front of a number indicates a backward position). A distance to the "pillar" is obtained as −20 m=100 m−120 m. A distance to the "automatic door" is obtained as 10 m=130 m−120 m.

At step S13-2-4, the surrounding-information-description generating unit 105-3 generates a description in which location information of a map information item is placed after a map-information-item name. For example, the message "an automatic door is 50 meters ahead on the right" is generated. In this case, map information item(s) existing after the present location in the traveling direction are sequenced in an order of proximity of the map information items to the present location. Further, following such map information item(s), the remaining map information item(s) sequenced in an order of proximity of the map information items to the present location backward in the traveling direction. FIG. 20B illustrates an example of a generated description.

Second Embodiment

As an example, in the first embodiment, explanation has been provided for the case where all alert items existing along a given section between the nodes are presented in one navigation message. However, in a case where multiple alert items exist along the section between the nodes, if all of the alert items are presented in one navigation message, a user such as a visually impaired person may not easily memorize those alert items. In view of the above, preferably, those alert items presented may be divided into many separated descriptions, or alternatively, they may be summarized so as to give a brief description. In a second embodiment, in light of a user's burden of listening, as an example, explanation will be provided below for a case where the number of alert items presented in one navigation message is set based on location information of each alert item and the number of alert items.

<Functional Configuration of Navigation Apparatus>

Figure 21:
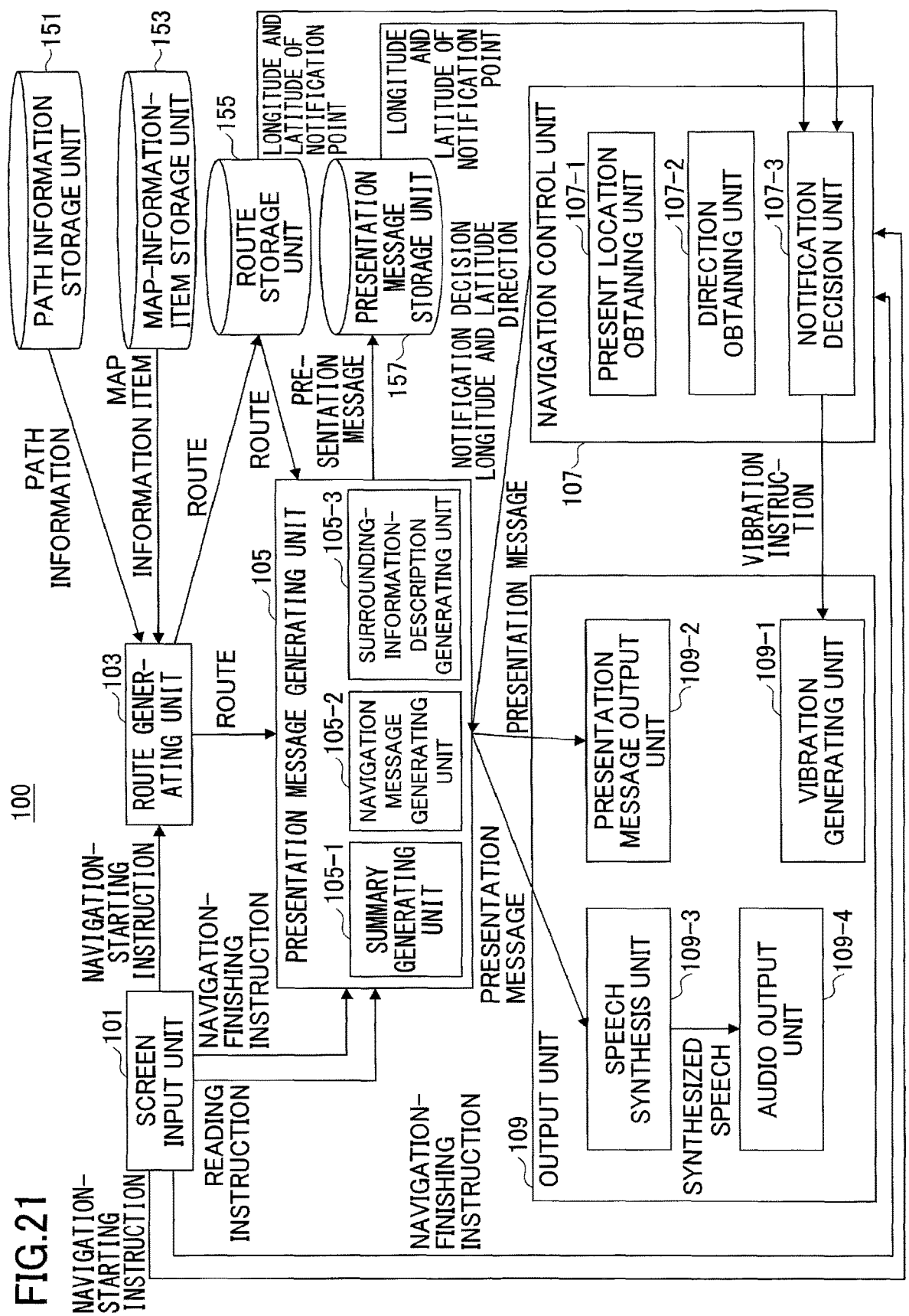
FIG. 21 is a diagram illustrating an example of a functional configuration of a navigation apparatus according to a second embodiment of the present invention.

FIG. 21 is a diagram illustrating an example of a functional configuration of a navigation apparatus 100 according to the second embodiment.

In the second embodiment, the navigation apparatus 100 has a similar function to that in FIG. 1. However, the navigation message generating unit 105-2 has a different function from that in the first embodiment, since alert items presented are divided into many separate descriptions. In such a manner, the respective notifications with respect to the separate descriptions are sent. In view of the above, unlike the first embodiment, the respective notification points of the navigation messages are inputted into a notification decision unit 107-3 from a presentation message storage unit 157. Further, a notification decision unit 107-3 has a different function from that in the first embodiment.

A navigation message generating unit 105-2, whose input includes a route generated by a route generating unit 103, and map information item(s) of the route, outputs a navigation message. Also, the navigation message generating unit 105-2, whose input includes a route stored in a route storage unit 155 and map information item(s) as well as a notification decision, a present location and a direction that are obtained from the navigation control unit 107, updates a navigation message to output the updated navigation message. For example, in a case where a plurality of alert items exist along a section to the next node, the navigation message generating unit 105-2 defines a set of alert items, from among the existing alert items, based on a distance between points where the alert items exist, as well as the number of alert items. In such a manner, the navigation message generating unit 105-2 generates a navigation message for each set of alert items. Also, in updating a navigation message as well, in a case where a plurality of alert items exist along a section to the next node, the navigation message generating unit 105-2 defines a set of alert items, from among the existing alert items, based on a distance between the points where the alert items exist, as well as the number of alert items, and generates a navigation message with respect to each set for updating. Further, the navigation message generating unit 105-2 sets a notification point where a navigation message generated with respect to each set of alert items is presented (e.g., the notification point is 5 meters before a point of a first placed alert item with respect to each set of alert items following a first set of alert items). Note that, in a case where an alert item exists at a notification point (e.g., 10 meters before a node excluding the starting point) set before a given node, the navigation message generating unit 105-2 may release a setting of such a notification point so as to cancel the notification (the notification is not performed). The process of generating and updating the navigation message will be described below.

The notification decision unit 107-3, whose input includes a present location from a present location obtaining unit 107-1, a direction from a direction obtaining unit 107-2, a route stored in the route storage unit 155 and a notification point of a navigation message stored in the presentation message storage unit 157, outputs a notification decision for indicating the timing of presenting a navigation message, as well as a vibration instruction. The notification decision unit 107-3 compares values with respect to the present location of the visually impaired person obtained by the present location obtaining unit 107-1, a given notification point of the route, a notification point set by the navigation message generating unit 105-2 and the setting of releasing a notification point, and then determines if the present location of the visually impaired person is at the notification point. If it is determined that the present location of the visually impaired person is at the notification point, the notification decision unit 107-3 determines that the notification is needed to be sent to the visually impaired person.

<Generation of Navigation Message>

Hereafter, the process of generating a navigation message by the navigation message generating unit 105-2 according to the second embodiment is described below.

Figure 22:
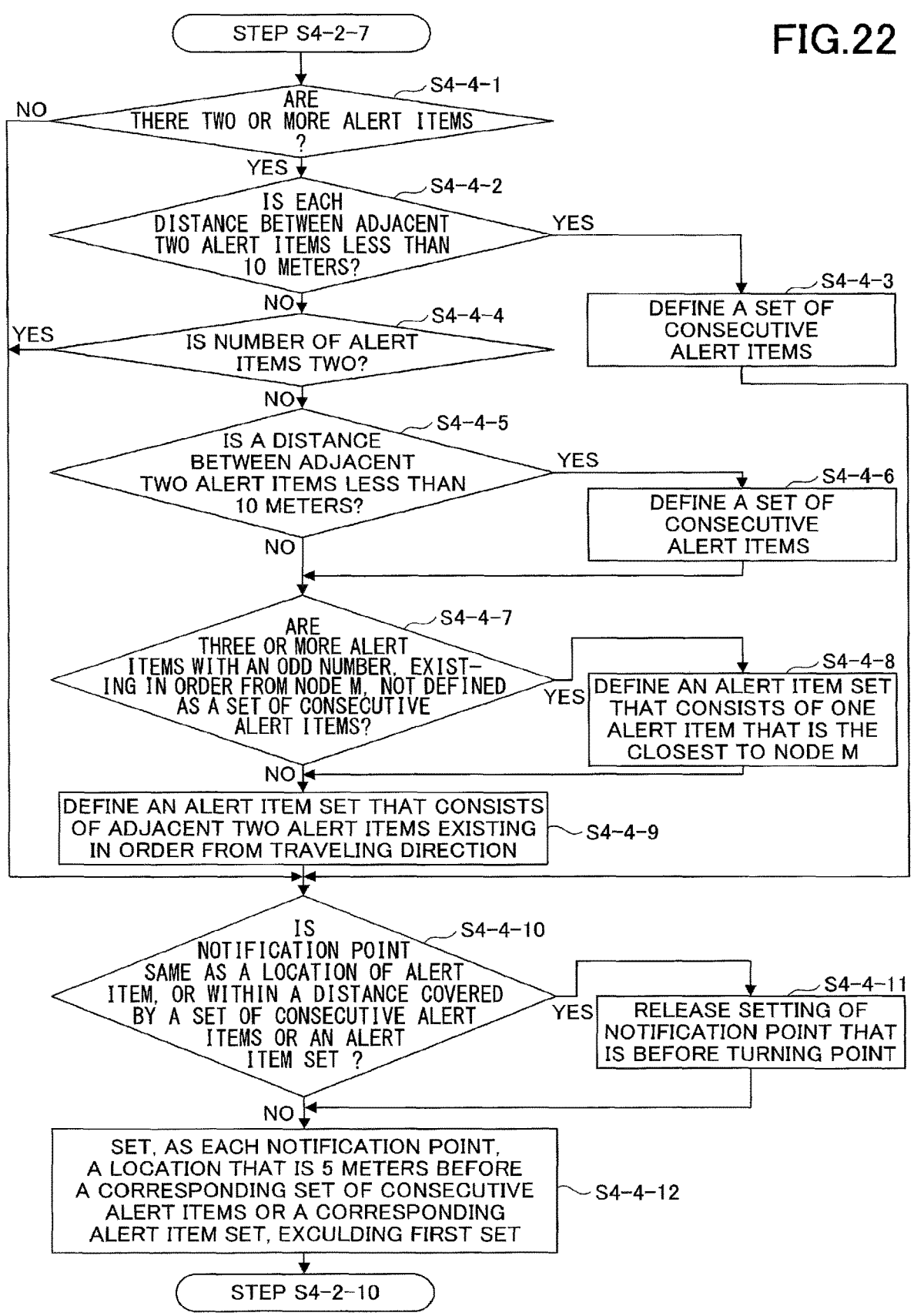
FIG. 22 is a flowchart illustrating an example of a process of generating a navigation message according to the second embodiment.

FIG. 22 is a flowchart illustrating an example of the process of generating a navigation message according to the second embodiment. The process illustrated in FIG. 22 is operated after step S4-2-7 in FIG. 10.

At step S4-4-1, the navigation message generating unit 105-2 determines if there are two or more alert items among the item(s) obtained at step S4-2-7. If there are two or more alert items, the process proceeds to step S4-4-2. If there is one or no alert item, the process proceeds to step S4-4-10.

At step S4-4-2, the navigation message generating unit 105-2 determines if each distance between the points of two alert items selected from among the alert items is less than 10 meters. In a case where each distance between the points of the two alert items is less than 10 meters, and further, the two alert items are adjacent, the process proceeds to step S4-4-3. If such a distance is 10 meters or more even with respect to one pair of alert items, the process proceeds to step S4-4-4. Note that in the present embodiment, as a criteria for determining if a distance between the points of two alert items is short, 10 meters are used by way of example. However, other distances may be used as the criteria, as long as the distance between the points of two alert items is within a distance between adjacent nodes of a given route, and the two alert items are considered as existing consecutively by the user.

Figure 23A:
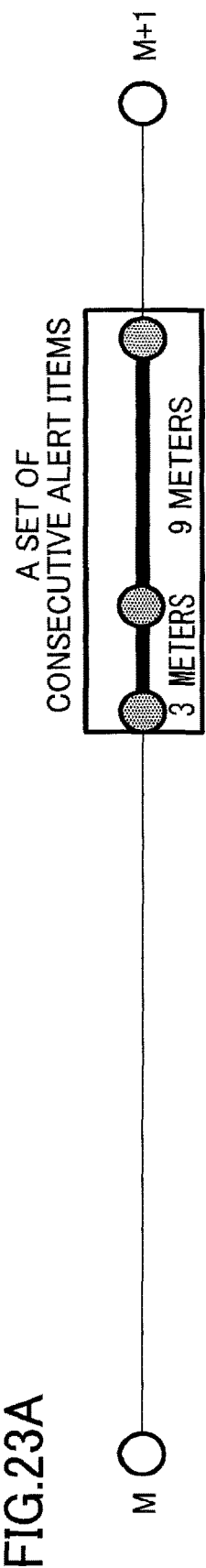
FIGS. 23A to 23D are diagrams for explaining an example of defining a set of consecutive alert items and an alert item set.

At step S4-4-3, the navigation message generating unit 105-2 defines a set of consecutive alert items that consists of all alert items (in the following description, a set of alert items in which a distance between adjacent two alert items is within a distance of less than 10 meters may be referred to as a "set of consecutive alert items"). In an example of FIG. 23A, with respect to a section between a node M and a node M+1, in a case where each distance between the points of adjacent two alert items selected from among three alert items is less than 10 meters, a set of consecutive three alert items is defined. In such a manner, a distance between a first alert item and the last alert item may be 10 meters or more, as illustrated in FIG. 23A. At step S4-4-3, in the case of defining a set of consecutive alert items, the process proceeds to step S4-4-10.

At step S4-4-4, the navigation message generating unit 105-2 determines if the number of alert items is two. If the number of alert items is two, the process proceeds to step S4-4-10 because a distance between the points of the two alert items is 10 meters or more. In the case of three alert items, the process proceeds to step S4-4-5.

At step S4-4-5, the navigation message generating unit 105-2 determines if a distance between two adjacent alert items, which are selected from among the two or more alert items, is less than 10 meters. If such a distance is less than 10 meters, the process proceeds to step S4-4-6. If such a distance is 10 meters or more, the process proceeds to step S4-4-7.

At step S4-4-6, the navigation message generating unit 105-2 defines a set of consecutive alert items that consists of the adjacent two alert items in which a distance between their alert items is less than 10 meters as determined at step S4-4-5. In an example of FIG. 23B, with respect to a section between a node M and a node M+1, a distance between the points of a second alert item and a third alert item is 10 meters or more. On the other hand, a distance between the points of a first alert item and a second alert item is less than 10 meters. Further, a distance between the points of a third alert item and a fourth alert item is less than 10 meters. In such a manner, a set of consecutive alert items that consists of first and second alert items, as well as a set of consecutive alert items that consists of third and fourth alert items, are defined. At step S4-4-6, in a case of defining a set of consecutive alert items that consists of adjacent two alert items in which a distance therebetween is less than 10 meters, the process proceeds to step S4-4-7.

At step S4-4-7, the navigation message generating unit 105-2 determines if alert items whose number is an odd number of three or more and that exist in order from a node M are not defined as a set. In other words, it is determined if the number of alert items existing in order from the node M, which are not defined as a set of consecutive alert items consisting of adjacent two alert items, is three or more. If such alert items are not defined as a set, the process proceeds to step S4-4-8, otherwise the process proceeds to step S4-4-9.

Figure 23B:
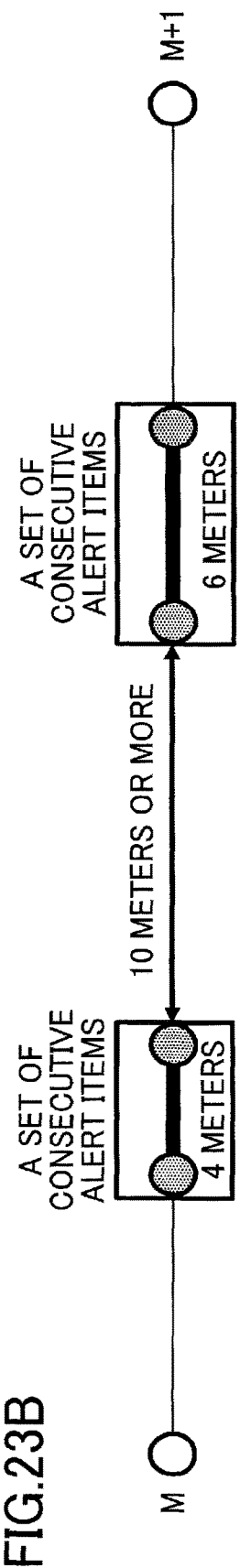
Figure 23C:
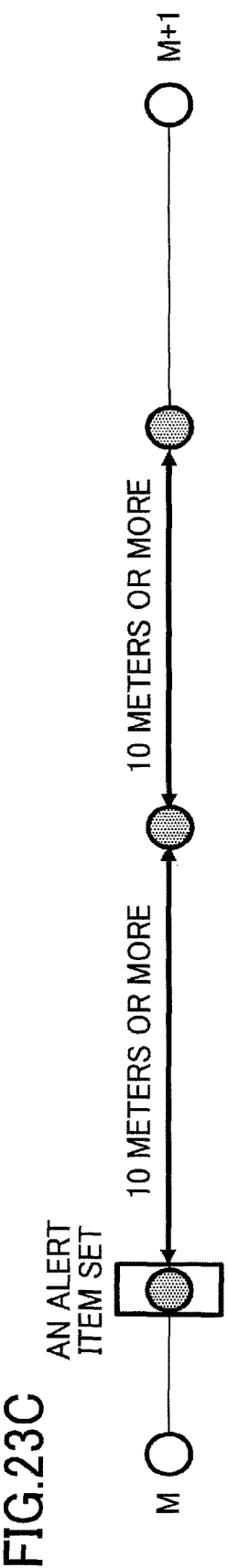

At step S4-4-8, the navigation message generating unit 105-2 defines, as an alert item set, a single alert item that is the closest to the node M, selected from among the alert items whose number is an odd number of three or more and existing in order from the node M. For example, as illustrated in FIG. 23C, in a case where three alert items existing in order from the node M are not defined as a set, a single alert item that is the closest to the node M is defined as an alert item set. In the case of defining such a set, the process proceeds to step S4-4-9.

At step S4-4-9, the navigation message generating unit 105-2 defines an alert item set that consists of adjacent two alert items existing in order from the traveling direction, selected from among alert items that are not defined as a set. In other words, the navigation message generating unit 105-2 defines an alert item set that consists of adjacent two alert items existing in order from the node N+1, selected from among alert items that are not defined as a set and that exist along in a section between the node M and the node M+1. For example, in an example of FIG. 23D, a second alert item and a third alert item existing in order from the node M are not defined as a set. In this example, an alert item set that consists of adjacent two alert items existing in order from the traveling direction, e.g., a direction from the node M+1 to the node M, is defined. In a case of defining an alert item set that consists of adjacent two alert items selected from among three or more alert items, if a total number of selected alert items is an even number such as 6, two alert items from among all alert items are defined as a set. In contrast, if a total number of alert items is an odd number such as 3, there are two options to define an alert item set. One is to define an alert item set that consists of adjacent two alert items, selected from alert items excluding a first alert item, to be defined as a set. Another is to define an alert item set that consists of adjacent two alert items, selected from alert items excluding the last alert item, to be defined as a set. In the present embodiment, in a case of defining an alert item set that consists of two alert items selected from among odd-numbered alert items, at step S4-4-8, a single alert item that is the closest to the node M is defined as an alert item set, thereby shortening a message to be presented at a point where the node M exists. At the point of the node M, a traveling distance, a turning direction, map information item(s) existing along a section to the next node, and the like are presented. In such a manner, in order to decrease the number of alert items to be presented at the point of the node M, in a case where alert items whose number is an odd number of 3 or more and that are not defined as a set exist, the number of alert items to be presented at the point of the node M is one. Note that in the present embodiment, explanation has been provided for the case of defining an alert item set that consists of adjacent two alert items on account of a user's burden of listening. However, three or more alert items may be defined as a set. In other words, in a case where L (L is an integer of 2 or more) alert items existing in order from the node M are not defined as a set, given that P (P is an integer of 2 or more) alert items are defined as a set, the number of alert items to be presented at the point of the node M indicates remainder Q (Q is an integer of 1 or more) obtained in a division of L divided by P. Also, in order to reduce a user's burden of listening at once, each of alert items that are not defined as a set may be defined as a set (in this case, step S4-4-2 to step S4-4-9 are skipped). Alternatively, given that the number of alert items to be presented at the point of the node M is one, an alert item set consisting of L alert items as well as an alert item set consisting of Q alert items may be defined for presenting. In a case of defining an alert item set consisting of adjacent two alert items or an alert item set (which may be referred to as a set of alert items) consisting of one alert item that is not defined as a set, the process proceeds to step S4-4-10.

At step S4-4-10, the navigation message generating unit 105-2 determines if a notification point that is 10 meters before a given node is same as a point where an alert item exists, or is within a distance covered by a set of consecutive alert items or an alert item set. In other words, the navigation message generating unit 105-2 determines if the point of the alert item is at the notification point, or is within a predetermined distance (e.g., a distance from a first alert item to the last alert item existing in the traveling direction along the route) of the section, in which alert items at both ends of the set of consecutive alert items or the alert item set are located. Note that, assuming that each point that is 10 meters before a corresponding node, excluding the starting point, is set as a notification point at step S4-4-10, if the notification point is at the point or in the section as described above, the process proceeds to step S4-4-11, otherwise the process proceeds to step S4-4-12.

At step S4-4-11, the navigation message generating unit 105-2 releases a setting of a given notification at a notification point (that is 10 meters before a given node) of the notification (so as not to send a notification). In an example of FIG. 24A, a certain point of an alert item is at the notification point that is 10 meters before the node M+1. In such a manner, the setting of the notification to be sent at the point that is 10 meters before the node M+1 is released (in FIG. 24A, the "notification is off" is indicated). In this example, if such a notification is sent, the user may stop walking near such a point of the alert item, and thus this may be negatively affected. For this reason, the above notification is not sent as described above. In a case of releasing the setting of the notification at a given notification point, the process proceeds to step S4-4-12.

At step S4-4-12, the navigation message generating unit 105-2 newly sets, as a notification point, a point that is 5 meters before a first alert item existing in each set of alert items (including a set of consecutive alert items and an alert item set), excluding a first set of alert items that is the closest to the node M. In an example of FIG. 24B, three alert items are divided into two sets. In this example, the navigation message generating unit 105-2 newly sets, as a notification point, a point that is 5 meters before a first alert item existing in a second set of alert items (in FIG. 24B, the "notification is on" is indicated). The presentation message storage unit 157 stores the setting of releasing a notification point as well as the new notification point, along with the navigation message. In the present embodiment, as the notification point, the point that is 5 meters before a given alert item is set, in consideration of a shortened traveling distance in a section in which alert items exist, as well as a case where the user is not able to stop walking after a notification is sent, or where there is a location error. However, as the newly set notification point, other points may be set, as long as they are points that are each before the notification point determined at S4-4-10 or step S4-4-11.

At step S4-2-10 in FIG. 10, the navigation message generating unit 105-2 generates a message based on the route, as described in the first embodiment.

Figure 23D:
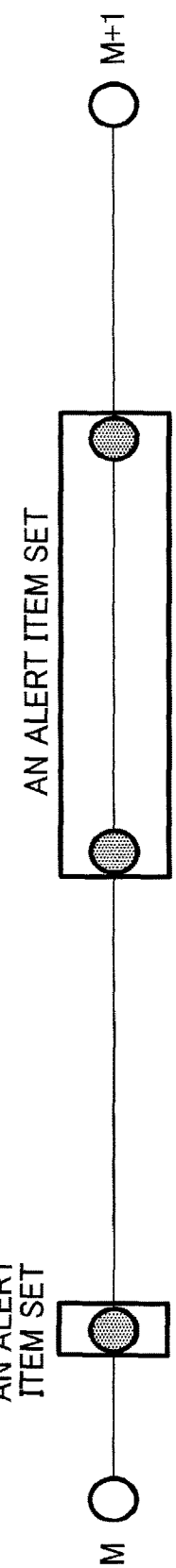

At step S4-2-14 in FIG. 10, the navigation message generating unit 105-2 generates a message based on the alert item(s), the walking-assistance item(s) or/and the landmark item. With respect to the set of alert items, the navigation message generating unit 105-2 generates a navigation message with respect to each set. In the example of FIG. 23A, the navigation message generating unit 105-2 generates, as a navigation message with respect to the node M, a navigation message based on three alert items. In the example of FIG. 23B, the navigation message generating unit 105-2 generates, as a navigation message with respect to the node M, a navigation message based on the first alert item and the second alert item. Further, the navigation message generating unit 105-2 generates, as a navigation message to be presented at a point that is before the third alert item, a navigation message based on the third alert item and the fourth alert item. In the example of FIG. 23D, the navigation message generating unit 105-2 generates, as a navigation message with respect to the node M, a navigation message based on the first alert item. Further, the navigation message generating unit 105-2 generates, as a navigation message to be presented at a point that is before the second alert item, a navigation message based on the second alert item and the third alert item.

At step S15 in FIG. 7, the notification decision unit 107-3 obtains the setting of releasing a notification point and the notification point stored in the presentation message storage unit 107-3, and determines if a notification is needed to be sent to the user. Note that, in a case where the navigation message generating unit 105-2 sets a new notification point, the output unit 109 outputs the navigation message generated before such a new notification point is set, until the user reaches the new notification point. After the user passes the new notification point, the output unit 109 outputs the navigation message generated after the new notification point is set.

FIG. 25B illustrates an example of a generated navigation message. For the example of FIG. 25A, a message with respect to a section from a node M to a node M+1 is divided into two separate parts. In this example, with respect to each part, the message as generated is illustrated in FIG. 25B. With respect to a section from the node M to a point that is 5 meters before stairs going down, the message with respect to the node M is outputted. With respect to a section from the point that is 5 meters before stairs going up, the message with respect to the section from the stairs going up is outputted. In this example, the message is generated for each part. However, if all alert items are presented at once, the user may not easily listen to them. For this reason, the message is generated for each part, as described above. Also, when generating a message with respect to a set of consecutive alert items, the navigation message generating unit 105-2 generates a message in which location information with respect to each of the alert items following a first alert item is omitted, and the word "followed by" is used. The message "on the way, stairs going down followed by stairs going up are consecutively 10 meters ahead" is of an example of the generated message. Thereby, the consecutively placed stairs can be easily perceived. In FIG. 25B, location information of a map information item is placed after a map-information-item name. In this example, the map-information-item name and the location information of the map information item are placed in this order, thereby enabling easily listening to necessary information, without suffering from an excess of stress in the guidance.

<Update of Navigation Message>

Hereafter, the process of updating a navigation message by the navigation message generating unit 105-2 according to the second embodiment is described.

Figure 26:
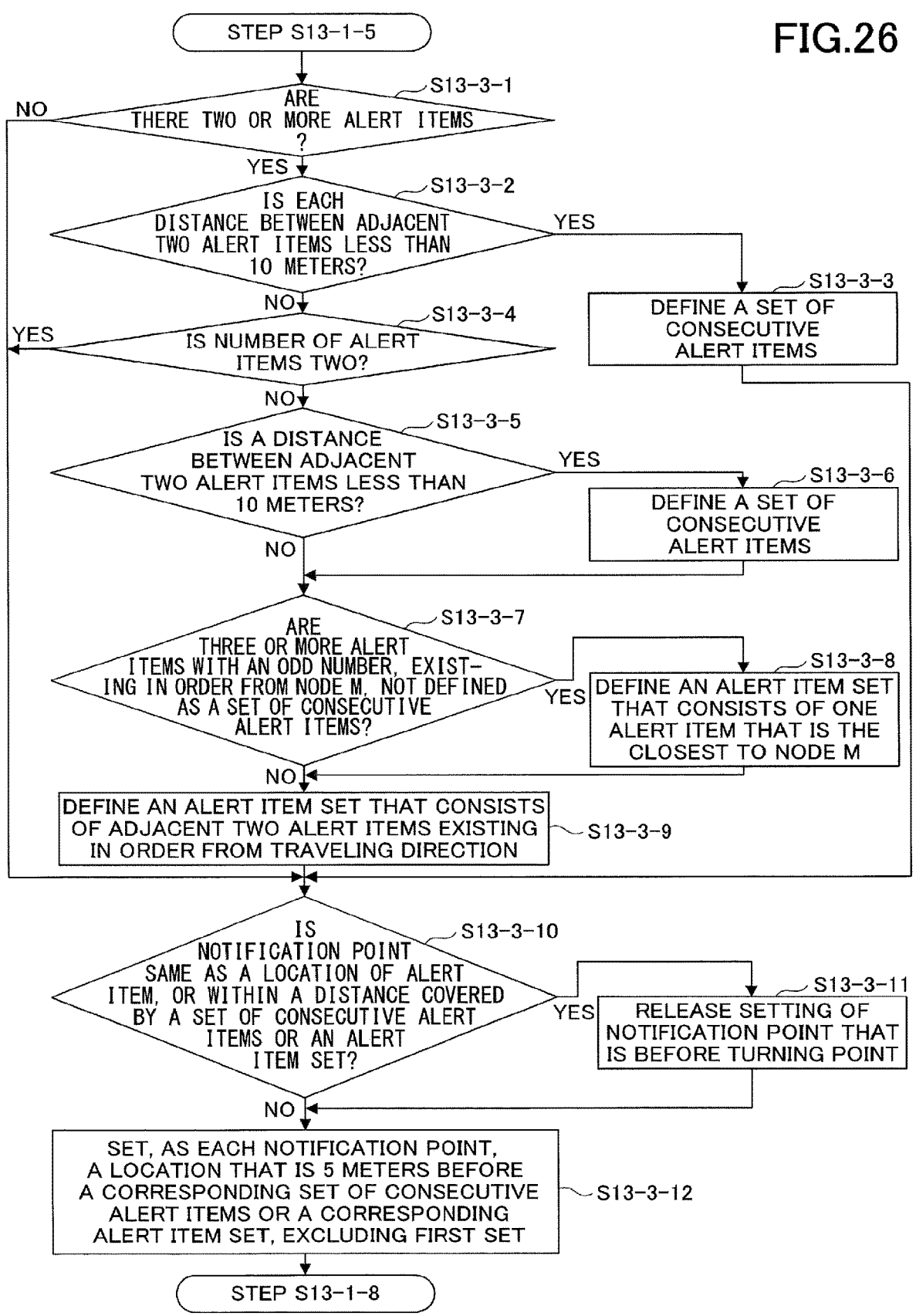
FIG. 26 is a flowchart illustrating an example of a process of updating a navigation message according to the second embodiment.

FIG. 26 illustrates an example of updating a navigation message according to the second embodiment. The process illustrated in FIG. 26 is operated after step S13-1-5 in FIG. 17.

At step S13-3-1, the navigation-message generating unit 105-2 determines if there are two or more alert items among the item(s) obtained at step S13-1-5. If there are two or more alert items, the process proceeds to step S13-3-2. If there is one or no alert item, the process proceeds to step S13-1-10.

At step S13-3-2, the navigation message generating unit 105-2 determines if each distance between the points of two alert items, selected from among the alert items, is less than 10 meters. In a case where each distance between the points of the two alert items is less than 10 meters, and further, the two alert items are adjacent, the process proceeds to step S13-3-3. Even if such a distance is 10 meters or more with respect to one pair of alert items, the process proceeds to step S13-3-4.

At step S13-3-3, the navigation message generating unit 105-2 defines a set of consecutive alert items that consists of all alert items. In such a manner, the process proceeds to step 13-3-10.

At step S13-3-4, the navigation-message generating unit 105-2 determines if the number of alert items is two. If the number of alert items is two, the process proceeds to step S13-3-10, because a distance between the points of the two alert items is 10 meters or more. In the case of three alert items, the process proceeds to step S13-3-5.

At step S13-3-5, the navigation message generating unit 105-2 determines if a distance between two adjacent alert items, which are selected from among the two or more alert items, is less than 10 meters. If such a distance is less than 10 meters, the process proceeds to step S13-3-6. If such a distance is 10 meters or more, the process proceeds to step S13-3-7.

At step S13-3-6, the navigation message generating unit 105-2 defines a set of consecutive alert items that consists of the adjacent two alert items, selected from among the alert items in which a distance between adjacent two alert items is less than 10 meters, as determined at step S13-3-5.

At step S13-3-7, the navigation message generating unit 105-2 determines if alert items whose number is an odd number of three or more and which exist in order from a node M are not defined as a set of consecutive alert items. If such alert items are not defined as a set of consecutive alert items, the process proceeds to step S13-3-8, otherwise the process proceeds to step S13-3-9.

At step S13-3-8, the navigation message generating unit 105-2 defines, as an alert item set, a single alert item that is the closest to the node M, selected from among the alert items whose number is an odd number of three or more and existing in order from the node M. If such a single alert item is defined as an alert item set, the process proceeds to step S13-3-9.

At step S13-3-9, the navigation message generating unit 105-2 defines an alert item set that consists of adjacent two alert items existing in order from the traveling direction, selected from among alert items that are not defined as a set. The process then proceeds to step S13-3-10.

At step S13-3-10, the navigation message generating unit 105-2 determines if a notification point that is 10 meters before a given node is same as a point where the given alert item exists, or is within a distance covered by a set of consecutive alert items or an alert item set. If such a notification point is same as the point or in the section as described above, the process proceeds to step S13-3-11, otherwise the process proceeds to step S13-3-12.

At step S13-3-11, the navigation message generating unit 105-2 releases a setting of a given notification (at a point that is 10 meters before a given node) of the notification.

At step S13-3-12, the navigation message generating unit 105-2 newly sets, as a notification point, a point that is 5 meters before a first alert item existing in each set of alert items (including a set of consecutive alert items and an alert item set), excluding a first set of alert items that is the closest to the node M. The presentation message storage unit 157 stores the setting of releasing a notification point as well as the new notification point, along with the navigation message.

At step S13-1-8 in FIG. 17, the navigation message generating unit 105-2 recalculates distances and orientation based on the present location and direction information, as described in the first embodiment.

At step S13-1-13 in FIG. 17, the navigation message generating unit 105-2 generates a message based on the alert item(s), the walking-assistance item(s) or the landmark item. In a case of defining a set of alert items, the navigation message generating unit 105-2 generates the message with respect to each set.

<Hardware Configuration of Navigation Apparatus>

Figure 27:
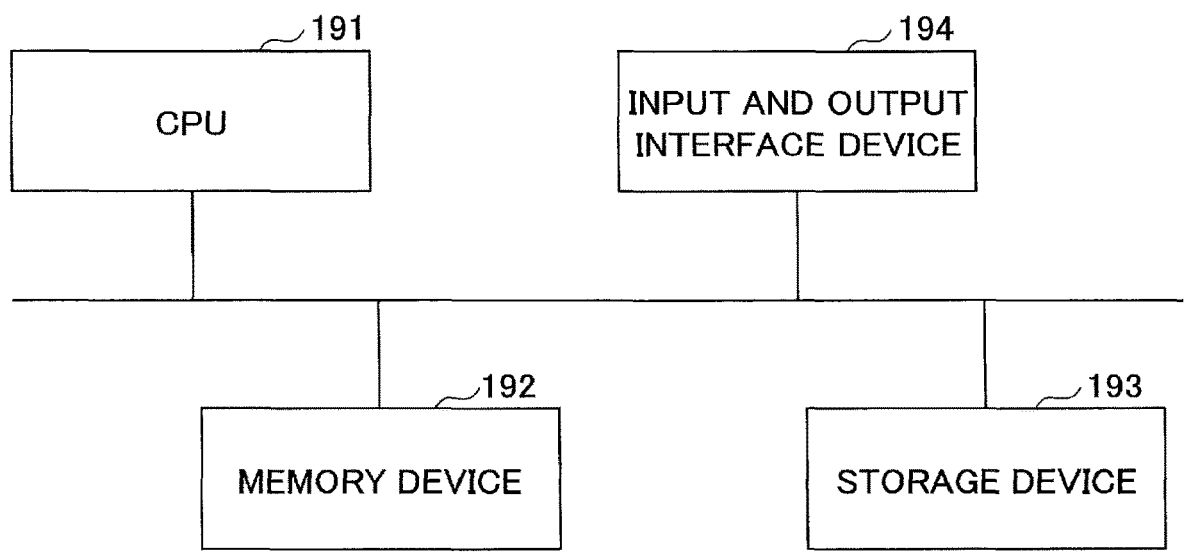
FIG. 27 is a diagram illustrating an example of a hardware configuration of the navigation apparatus according to the first and second embodiments.

FIG. 27 is a diagram illustrating an example of a hardware configuration of the navigation apparatus 100 according to the first and second embodiments. The navigation apparatus 100 may be a computer that includes a processor such as a CPU (Central Processing Unit) 191, a memory device 192 such as a RAM (Random Access Memory) or a ROM (Read Only Memory), and a storage device 193 such as a hard disk. For example, a program and data stored in the storage device 193 or the memory device 192 are executed by the CPU 191 to implement a function and a process of the navigation apparatus 100. An input and output interface device 194 may enable data to be inputted into the navigation apparatus 100 or enable data to be outputted from the navigation apparatus 100. Note that the input and output interface device 194 may be physically separated from the navigation apparatus 100. For example, the navigation apparatus 100 may be a smartphone having a touch screen (which is implemented by one hardware component including a liquid crystal display with a touch sensor), a tablet, a notebook PC (personal computer), a desktop PC, or the like.

Note that, with respect to functional units for generating a navigation message in the navigation apparatus 100, such as the route generating unit 103 and the presentation message generating unit 105, they may be implemented by a single navigation message generating apparatus. Also, in a case where a client and a server perform the processing described above, the client may include the screen input unit 101, the navigation control unit 107 and the output unit 109, which serve as a navigation message output apparatus. Also, the server may include the route generating unit 103, the presentation message generating unit 105, and the like, which serve a navigation message generating apparatus. With respect to processing units excluding the screen input unit 101, the navigation control unit 107 and the output unit 109, their functions and data may be implemented using a distributed system for communicating via the Internet or the like.

Supplement of Embodiments

According to the embodiments, the navigation apparatus 100 can appropriately send a notification in providing voice guidance, thereby providing a visually impaired person with voice guidance as requested by the visually impaired person. In such a manner, it is possible to assist the visually impaired person in order to reach the destination safely, without suffering from an excess of stress in the guidance. In consideration of sound leakage, the visually impaired person can perceive the message to reach the destination.

Also, the presentation message is generated with respect to each section from one turning point to another turning point, thereby presenting appropriate contents and amount of information. It is possible to assist the visually impaired person without suffering from an excess of stress in the guidance.

The presentation message is generated based on location information of the visually impaired person, thereby providing voice guidance according to a present location of visually impaired person.

In a case where many alert items are located between the nodes, a message about their items is presented so as to be divided into separate parts, thereby presenting a short message, without suffering from an excess of stress in the guidance.

For the sake of convenience of description, in the embodiments, the configuration of the navigation apparatus 100 has been described with reference to the functional block diagrams. However, such a navigation apparatus 100 may be implemented by hardware, software, or a combination thereof. For example, in the embodiments, a program is executed by a computer to implement the function of the navigation apparatus 100. A program or the like is executed by a computer to implement the process of the method available to the navigation apparatus 100. Also, with respect to the functional units of the navigation apparatus 100, two or more among them may be combined as needed. In the embodiments, the step order described above may be changed.

This disclosure has been described for the case where the word order or the like is changed, without suffering from an excess of stress in the guidance. The disclosure is not limited to the embodiments. Various modifications or changes to the embodiments may be made within the scope of claims of the present invention.

What is claimed is:

1. An apparatus for generating a navigation message for a person traveling on foot, comprising:
 a route generating unit configured to generate a route, the route including:
   nodes from a starting point to a destination, the nodes indicating the starting point, the destination, and at least one turning points therebetween,
   one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person;
 a memory device stores the map information items associated with the at least one of the alert item, the walking-assistance item, and the landmark item, wherein the memory device stores the at least one of the alert item, the walking-assistance item, and the landmark item;
 a navigation message generating unit configured to generate a navigation message about the generated route based on the generated route, the one or more map information items of the generated route, and an order of priority in which map information items are presented; and
 an audio outputting unit configured to generate audio information relating to the generated navigation message, the generated audio information being stored in the memory device,
 wherein the navigation message generating unit is configured to include, in the navigation message, a description about a given section of the generated route, such that,
 when an end node at an end of the given section is located within a predetermined distance from a given object existing along the given section, the description includes a map information item associated with the given object as an indication of the end node,
 when the given section has one or more map information items associated with the alert item or the walking-assistance item, the description includes the one or more map information items associated with the alert item or the walking-assistance item, and
 when the given section has no map information items associated with either the alert item or the walking-assistance item, and has one or more map information items associated with the landmark item, the description includes a map information item selected, from the one or more map information items associated with the landmark item, in the order of priority in which map information items are presented, and the memory device stores each map information item in association with (i) an attribution of object of a given map information item and (ii) location information indicating a location of the object, the attribution of object indicating as to whether the object located along the path connecting the nodes is continuously formed in whole or in part in the given section, and the navigation message generating unit is configured to
determine whether the attribution of object associated with the selected map information item indicates that the object located along the path connecting the nodes is continuously formed in whole or in part in the given section, by referring to the memory device, and generate, upon determining that the attribution of object indicates that the object located along the path connecting the nodes is continuously formed in whole or in part in the given section, the navigation message such that the description does not include the location information of a corresponding map information item associated with the determined attribution of object.

2. The apparatus according to claim 1, wherein the map information item includes a map-information-item name indicating a name of the object located along the path connecting the nodes, and includes location information indicating a location of the object, and wherein the navigation message generating unit is configured to generate the navigation message, such that in the description, the location information of the map information item is placed after a corresponding map-information-item name.

3. An apparatus for generating a navigation message for a person traveling on foot, comprising:

a route generating unit configured to generate a route, the route including:
nodes from a starting point to a destination, the nodes indicating the starting point, the destination, and at least one turning points therebetween,
one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person;

a memory device stores the map information items associated with the at least one of the alert item, the walking-assistance item, and the landmark item, wherein the memory device stores the at least one of the alert item, the walking-assistance item, and the landmark item;

a navigation message generating unit configured to generate a navigation message about the generated route based on the generated route, the one or more map information items of the generated route, and an order of priority in which map information items are presented; and an audio outputting unit configured to generate audio information relating to the generated navigation message, the generated audio information being stored in the memory device, wherein the navigation message generating unit is configured to include, in the navigation message, a description about a given section of the generated route, such that,
when an end node at an end of the given section is located within a predetermined distance from a given object existing along the given section, the description includes a map information item associated with the given object as an indication of the end node,
when the given section has one or more map information items associated with the alert item or the walking-assistance item, the description includes the one or more map information items associated with the alert item or the walking-assistance item, and
when the given section has no map information items associated with either the alert item or the walking-assistance item, and has one or more map information items associated with the landmark item, the description includes a map information item selected, from the one or more map information items associated with the landmark item, in the order of priority in which map information items are presented, and the memory device stores each map information item in association with (i) a map-information-item name indicating a name of the object located along the path connecting the nodes and (ii) location information indicating a location of the object, and the navigation message generating unit is configured to
determine whether the given section has multiple map information items associated with a same map-information-item name, by referring to the memory device,
retrieve, upon determining that the given section has the multiple map information items associated with the same map-information-item name, the location information of each map information item, from the memory device, and
generate the navigation message such that the same map-information-item name, the retrieved location information of each map information item, and the number of the map information items are sequenced in this order.

4. An apparatus for generating a navigation message for a person traveling on foot, comprising:

a route generating unit configured to generate a route, the route including:
nodes from a starting point to a destination, the nodes indicating the starting point, the destination, and at least one turning points therebetween,
one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person;

a memory device stores the map information items associated with the at least one of the alert item, the walking-assistance item, and the landmark item, wherein the memory device stores the at least one of the alert item, the walking-assistance item, and the landmark item;

a navigation message generating unit configured to generate a navigation message about the generated route based on the generated route, the one or more map information items of the generated route, and an order of priority in which map information items are presented, and an audio outputting unit configured to generate audio information relating to the generated navigation message, the generated audio information being stored in the memory device, wherein the navigation message generating unit is configured to include, in the navigation message, a description about a given section of the generated route, such that, when an end node at an end of the given section is located within a predetermined distance from a given object existing along the given section, the description includes a map information item associated with the given object as an indication of the end node, when the given section has one or more map information items associated with the alert item or the walking-assistance item, the description includes the one or more map information items associated with the alert item or the walking-assistance item, and when the given section has no map information items associated with either the alert item or the walking-assistance item, and has one or more map information items associated with the landmark item, the description includes a map information item selected, from the one or more map information items associated with the landmark item, in the order of priority in which map information items are presented, and the memory device stores each alert item and location information of a given alert item in association with each other, and the navigation message generating unit is configured to generate, upon determining that the multiple map information items with the alert items are located within the predetermined distance, the navigation message such that the multiple map information items are defined as a set, and with respect to each set of map information items, the description does not include location information of each of second and subsequent map information items.

5. The apparatus according to claim 4, wherein the navigation message generating unit is configured to generate the navigation message, such that, when the given section does not have a set of L (L is an integer of two or more) map information items that are classified as the alert items and that are located from a starting node of the given section, and a remainder Q obtained in a division of L divided by a predetermined number P (P is an integer of two or more) is one or more, the description includes Q map information items with respect to the starting node, and includes one or more sets of adjacent P map information items at a notification point of the navigation message, the notification point being set with respect to each set of adjacent P map information items.

6. The apparatus according to claim 4, wherein the navigation message generating unit is configured to generate the navigation message, such that, with respect to a starting node of the given section, the description includes a map information item that is classified as the alert item and that is closest to the starting node, and includes a set of adjacent map information items, whose number is a predetermined number, at a notification point of the navigation message, the notification point being set with respect to each set of adjacent map information items.

7. A navigation system, comprising;

a navigation message generating apparatus for generating a navigation message for a person traveling on foot, comprising:

a route generating unit configured to generate a route, the route including:

nodes from a starting point to a destination, the nodes indicating the starting point, the destination, and one or more turning points therebetween, one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person; and a memory device stores the map information items associated with the at least one of the alert item, the walking-assistance item, and the landmark item, wherein the memory stores the at least one of the alert item, the walking-assistance item, and the landmark item;

a navigation message generating unit configured to generate a navigation message about the generated route based on the generated route, the one or more map information items of the generated route, and an order of priority in which map information items are presented; and an audio outputting unit configured to generate audio information relating to the generated navigation message, the generated audio information being stored in the memory device;

a navigation message output apparatus for outputting a navigation message for a person traveling on foot, the foot navigation message output apparatus comprising:

a present location obtaining unit configured to obtain a present location of a person;

a direction obtaining unit configured to obtain a direction of the person;

a notification decision unit configured to obtain the route generated by the navigation message generating apparatus, and determine the timing of presenting the navigation message based on the obtained route, and the obtained present location and direction;

an output unit configured to send a notification to the person, and output the navigation message generated by the navigation message generating apparatus, wherein the navigation message generating unit is configured to include, in the navigation message, a description about a given section of the generated route, such that, when an end node at an end of the given section is located within a predetermined distance from a given object existing along the given section, the description includes a map information item associated with the given object as an indication of the end node, when the given section has one or more map information items associated with the alert item or the walking-assistance item, the description includes the one or more map information items associated with the alert item or the walking-assistance item, and when the given section does not have map information items associated with either the alert item or the walking-assistance item, and has one or more map information items classified as the landmark item, the description includes map information items selected, from the one or more map information items associated with the landmark item, in the order of priority in which map information items are presented, and the memory device stores each map information item in association with (i) an attribution of object of a given map information item and (ii) location information indicating a location of the object, the attribution of object indicating as to whether the object located along the path connecting the nodes is continuously formed in whole or in part in the given section, and the navigation message generating unit is configured to
determine whether the attribution of object associated with the selected map information item indicates that the object located along the path connecting the nodes is continuously formed in whole or in part in the given section, by referring to the memory device, and generate, upon determining that the attribution of object indicates that the object located along the path connecting the nodes is continuously formed in whole or in part in the given section, the navigation message such that the description does not include the location information of a corresponding map information item associated with the determined attribution of object.

8. A method for generating a navigation message for a person traveling on foot, comprising:
generating a route, the route including:
nodes from a starting point to a destination, the nodes indicating the starting point, the destination, and one or more turning points therebetween,
one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person, wherein the map information items associated with the at least one of the alert item, the walking-assistance item, and the landmark item are stored in a memory device, and the memory device stores the at least one of the alert item, the walking-assistance item, and the landmark item;
generating a navigation message about the generated route based on the generated route, the one or more map information items of the generated route, and an order of priority in which map information items are presented; and
outputting audio information relating to the generated navigation message,
wherein the memory device stores the audio information,
wherein the generating a navigation message includes
generating, in the navigation message, a description about a given section of the generated route, such that,
when an end node at an end of the given section is located within a predetermined distance from a given object existing along the given section, the description includes a map information item associated with the given object as an indication of the end node,
when the given section has one or more map information items associated with the alert item or the walking-assistance item, the description includes the one or more map information items associated with the alert item or the walking-assistance item, and when the given section does not have map information items associated with either the alert item or the walking-assistance item, and has one or more map information items classified as the landmark item, the description includes map information items selected, from the one or more map information items associated with the landmark item, in the order of priority in which map information items are presented, and the generating a navigation message includes
referring to the memory device to determine whether the attribution of object associated with the selected map information item indicates that the object located along the path connecting the nodes is continuously formed in whole or in part in the given section, wherein the memory device stores each map information item in association with (i) an attribution of object of a given map information item and (ii) location information indicating a location of the object, the attribution of object indicating as to whether the object located along the path connecting the nodes is continuously formed in whole or in part in the given section, and generating, upon determining that the attribution of object indicates that the object located along the path connecting the nodes is continuously formed in whole or in part in the given section, the navigation message such that the description does not include the location information of a corresponding map information item associated with the determined attribution of object.

9. An apparatus for generating a navigation message for a person traveling on foot, comprising:
a route generating unit configured to generate a route, the route including:
nodes from a starting point to a destination, the nodes indicating the starting point, the destination, and at least one turning points therebetween,
one or more map information items, each of which is associated with an object existing along a path connecting the nodes, and is classified as at least one of an alert item indicating that the object presents danger to the person, a walking-assistance item indicating that the object serves to assist walking, and a landmark item indicating that the object is perceivable by the person;
a memory device stores the map information items associated with the at least one of the alert item, the walking-assistance item, and the landmark item, wherein the memory device stores the at least one of the alert item, the walking-assistance item, and the landmark item;
a navigation message generating unit configured to generate a navigation message about the generated route based on the generated route, the one or more map information items of the generated route, and an order of priority in which map information items are presented; and
an audio outputting unit configured to generate audio information relating to the generated navigation message, the generated audio information being stored in the memory device,
wherein the navigation message generating unit is configured to include, in the navigation message, a description about a given section of the generated route, such that,
when an end node at an end of the given section is located within a predetermined distance from a given object existing along the given section, the description includes a map information item associated with the given object as an indication of the end node, when the given section has one or more map information items associated with the alert item or the walking-assistance item, the description includes the one or more map information items associated with the alert item or the walking-assistance item, and when the given section has no map information items associated with either the alert item or the walking-assistance item, and has one or more map information items associated with the landmark item, the description includes a map information item selected, from the one or more map information items associated with the landmark item, in the order of priority in which map information items are presented, and wherein the order of priority in which the map information items are presented is set based on an extent to which the person is visually impaired and a perception ability from hearing with respect to the object used in the navigation.

10. The navigation system according to claim 7, wherein the order of priority in which the map information items are presented is set based on an extent to which the person is visually impaired and a perception ability from hearing with respect to the object used in the navigation.

11. The method to claim 8, wherein in the generating of the navigation message, the order of priority in which the map information items are presented is set based on an extent to which the person is visually impaired and a perception ability from hearing with respect to the object used in the navigation.

* * * * *